US006789057B1

(12) United States Patent
Morimoto et al.

(10) Patent No.: US 6,789,057 B1
(45) Date of Patent: Sep. 7, 2004

(54) DICTIONARY MANAGEMENT METHOD AND APPARATUS

(75) Inventors: Yasutsugu Morimoto, Kokubunji (JP); Junichi Matsuda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/003,885

(22) Filed: Jan. 7, 1998

(30) Foreign Application Priority Data

Jan. 7, 1997 (JP) .............................. 9-000547

(51) Int. Cl.[7] .............................................. G06F 17/28
(52) U.S. Cl. ................................................ 704/2; 704/7
(58) Field of Search ........................ 704/2–8, 277; 707/530, 536

(56) References Cited

U.S. PATENT DOCUMENTS

| 4,502,128 A | * | 2/1985 | Okajima et al. | 704/2 |
|---|---|---|---|---|
| 4,641,264 A | * | 2/1987 | Nitta et al. | 704/2 |
| 5,497,319 A | * | 3/1996 | Chong et al. | 704/2 |
| 5,528,491 A | * | 6/1996 | Kuno et al. | 704/8 |
| 5,535,120 A | * | 7/1996 | Chong et al. | 704/2 |
| 5,541,836 A | * | 7/1996 | Church et al. | 704/7 |
| 5,579,224 A | * | 11/1996 | Hirakawa et al. | 704/2 |
| 5,587,903 A | * | 12/1996 | Yale | 704/8 |
| 5,677,835 A | * | 10/1997 | Carbonell et al. | 70/2 |
| 5,751,957 A | * | 5/1998 | Hiroya et al. | 704/7 |
| 5,805,832 A | * | 9/1998 | Brown et al. | 704/2 |
| 5,848,386 A | * | 12/1998 | Motoyama | 704/2 |
| 5,983,169 A | * | 11/1999 | Kozna | 704/2 |
| 5,987,402 A | * | 11/1999 | Murata et al. | 704/2 |

FOREIGN PATENT DOCUMENTS

| JP | 03-053377 | 3/1991 |
|---|---|---|
| JP | 08-087507 | 4/1996 |

OTHER PUBLICATIONS

Abstract for JP 04–205059, "Translation Device Network System", OKI ELECTRIC IND CO LTD, Jul. 27, 1992.
Abstract for JP 04–205060, "Network System for Translation Device", OKI ELECTRIC IND CO LTD, Jul. 27, 1992.

* cited by examiner

Primary Examiner—Patrick N. Edouard
(74) Attorney, Agent, or Firm—Antonelli, Terry, Stout & Kraus, LLP

(57) ABSTRACT

An information processing apparatus connected to a network to translate a document using a translation knowledge cost-effectively is provided with a dictionary; an inquiry device for transmitting, during a time translating a sentence written in a first language, an inquiry for inquiring the translation knowledge for translating a syntactic unit of the sentence written in the first language containing an unknown word and a correct grammar to the network, after translating other words of the sentence into a second language, when the unknown word that cannot be translated into the second language is recognized during translation of the document; and a translation device for estimating a part of speech for the unknown word to apply a hypothesis-setting rule during translation of the sentence, and for continuing translation of a syntax following the syntactic unit of the sentence, wherein the syntactic unit is translated by using an answer to replace the translation of the sentence when the answer to the inquiry is received.

16 Claims, 17 Drawing Sheets

FIG.2

| | URL | x MONTH AND y DAY | ... | ... | ... |
|---|---|---|---|---|---|
| 1 | http://info..../robots.html | 60 | 200 | 100 | 40 |
| 2 | http://net...com/index.html | 0 | 0 | 60 | 50 |
| 3 | http://www....com | 290 | 400 | 1600 | 1600 |
| | ... | ... | ... | ... | ... |

FIG.3

| DICTIONARY ENTRY | DICTIONARY INFORMATION POINTER | | DICTIONARY INFORMATION POINTER | | DICTIONARY INFORMATION POINTER | |
|---|---|---|---|---|---|---|
| | POINTER CLASSIFICATION | POINTER VALUE | POINTER CLASSIFICATION | POINTER VALUE | POINTER CLASSIFICATION | POINTER VALUE |
| Big Apple | L | 16435 | | | | |
| Big Blue | C | 44825 | R | 133.144.18.152 | | |
| Big Dipper | R | 133.144.18.150 | R | 133.144.18.154 | R | 133.144.18.154 |
| ... | ... | ... | ... | ... | ... | ... |

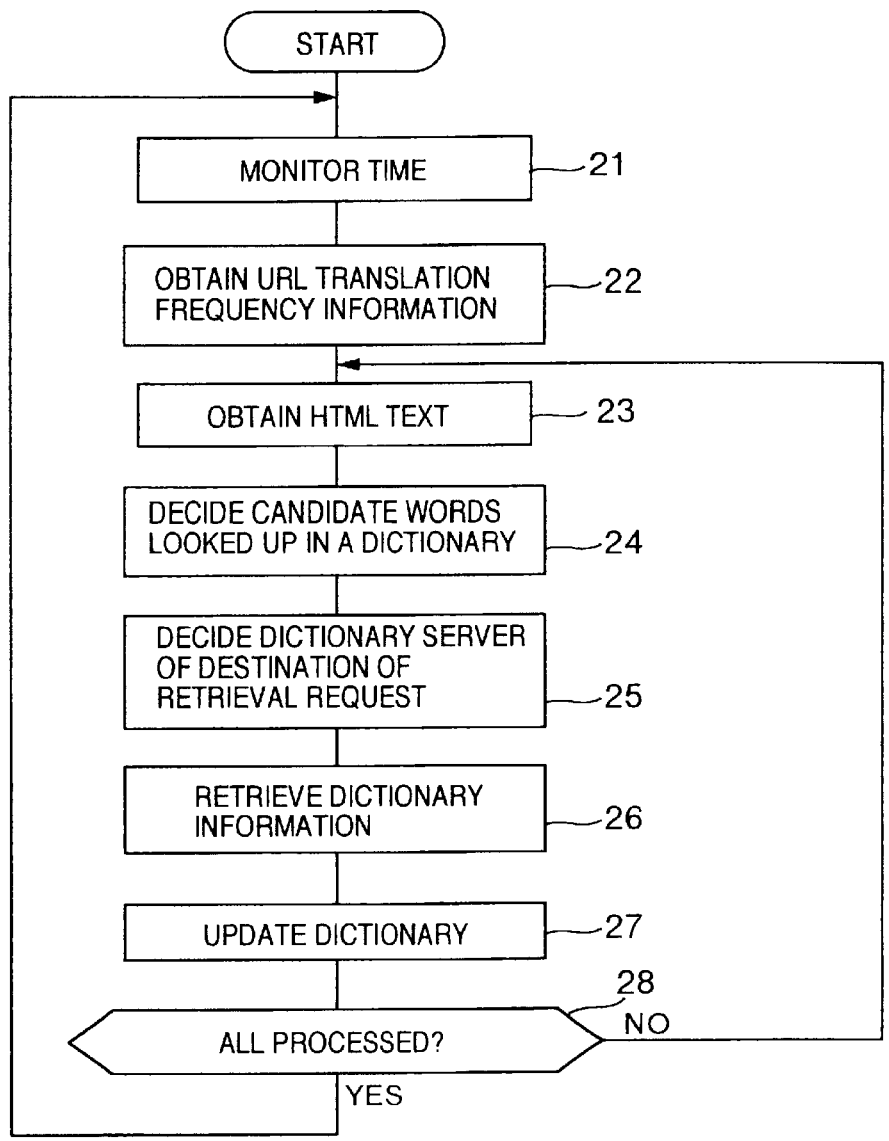

| DESTINATION OF REQUEST | DICTIONARY SERVER NAME | SUCCESS FLAG | CONTENTS CLASSIFICATION | ENCIPHERMENT FLAG | DICTIONARY INFORMATION |
|---|---|---|---|---|---|

FIG.11

| CONDITION | METHOD OF GENERATING DICTIONARY ENTRY CHARACTER STRING |
|---|---|
| NONE | NONE |
| ENDING OF WORD IS ves | ALTER ves TO f OR fe |
| ENDING OF WORD IS ies | ALTER ies TO y |
| ENDING OF WORD IS es | ALTER es TO e |
| ENDING OF WORD IS s | DELETE s |
| ENDING OF WORD IS ied | ALTER ied TO y |
| ENDING OF WORD IS TWO CONSONANTS +ed | DELETE ed AND ONE CONSONANT |
| ENDING OF WORD IS ed | DELETE ed |
| ENDING OF WORD IS d | DELETE d |
| ENDING OF WORD IS TWO CONSONANTS +ing | DELETE ing AND ONE CONSONANT |
| ENDING OF WORD IS ing | ALTER ing TO e |
| ENDING OF WORD IS ing | DELETE ing |

FIG.14

| DICTIONARY SERVER IP ADDRESS | RETRIEVAL FREQUENCY | SUCCESS FREQUENCY | EQUIVALENT ALTERATION INFORMATION |
|---|---|---|---|
| 133.144.18.150 | 100 | 18 | 2 |
| 133.144.18.154 | 200 | 160 | 40 |
| 133.144.18.97 | 248 | 200 | 10 |
| ... | ... | ... | ... |

FIG.15

| DICTIONARY SERVER NAME | FREQUENCY |
|---|---|
| DICTIONARY SERVER 1 | 80 |
| DICTIONARY SERVER 2 | 40 |
| DICTIONARY SERVER 3 | 10 |
| ... | ... |

| CONDITION | A PART OF SPEECH |
|---|---|
| LAST CHARACTER STRING IS " ly " | ADVERB |
| LAST CHARACTER STRING IS " ive " | ADJECTIVE |
| LAST CHARACTER STRING IS " ate " | VERB |
| LAST CHARACTER STRING IS " ize " | VERB |
| LAST CHARACTER STRING IS " ed " | VERB, ADJECTIVE |
| . . . | . . . |
| IN OTHER CASES | NOUN |

| DICTIONARY SERVER NAME | ENCRYPT KEY |
|---|---|
| DICTIONARY SERVER 1 | 102340923783248 |
| DICTIONARY SERVER 2 | 192873921372398 |
| ... | ... |

FIG.23
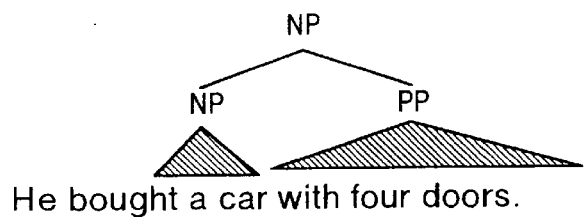
He bought a car with four doors.
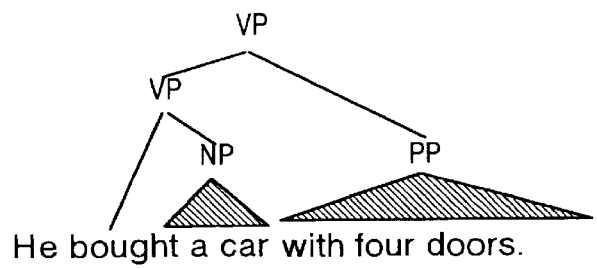
He bought a car with four doors.
FIG.24
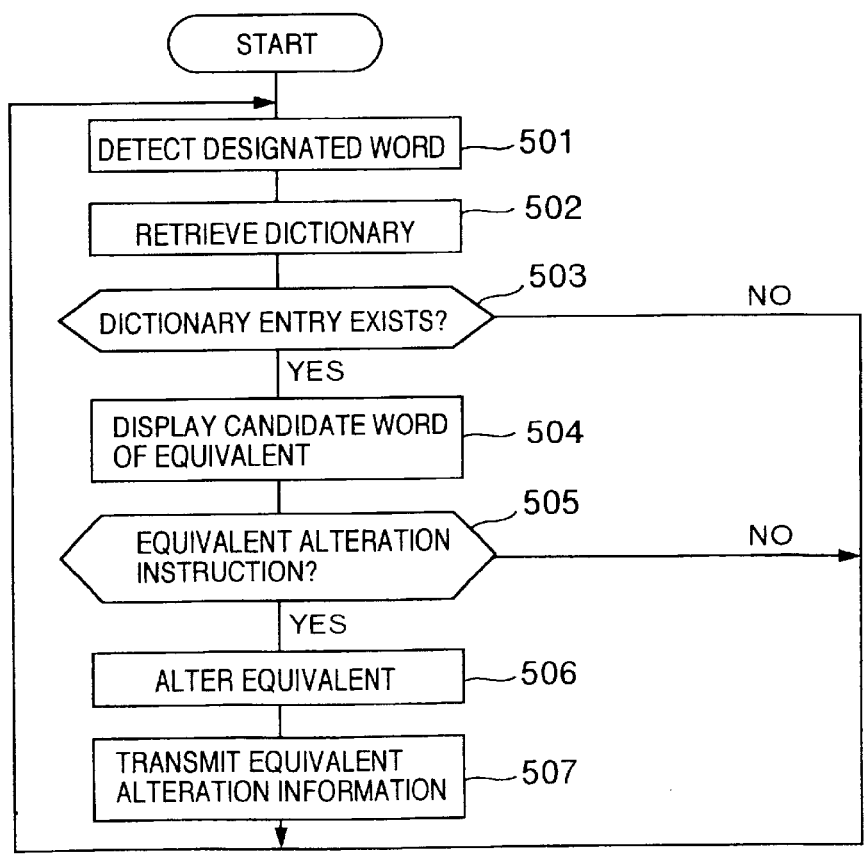

DICTIONARY MANAGEMENT METHOD AND APPARATUS

BACKGROUND OF THE INVENTION

1. Field of the Invention

The present invention relates to a method of managing bilingual dictionaries distributed on a network and a machine translation method using such method.

2. Description of the Related Art

U.S. Pat. No. 4,641,264, JP-A-6-259600, JP-A-5120336 and U.S. Pat. No. 4,502,128 describe a dictionary retrieval, a translation knowledge, a URL (uniform resource location), an HTML (hypertext markup language) and a dictionary distribution server/client system.

At present, in accordance with a development of a network, in particular, a widespread of an internet, users are able to easily access information of foreign languages which comprise mainly English.

The JP-A-6-259600, for example, describes an example in which users share a machine translation dictionary by effectively utilizing a network, and proposes a system which is connected to the network via dictionaries. When this system is applied to a translation, translation dictionaries of respective languages such as English and Russian are previously connected to the system and a language of an inputted word is discriminated. Thereafter, inputted data (image data of character) is transferred to a center having a corresponding translation dictionary. According to the above-mentioned related art, dictionaries that are used to translate specific fields or specific languages are limited, and words that could not be translated such dictionaries are processed as words which cannot be translated.

In the machine translation, a quality of a dictionary and a coverage of words considerably affect the quality of the translation. However, information on the internet covers a considerably wide field. Moreover, new information appears on the internet day by day so that it takes the high cost for supplement dictionaries in corresponding to the increase of words of a wide field and new words.

Further, service providers or makers of machine translation machines having dictionaries supplemented by other servers are used to provide dictionaries of new versions at every several months. There is then the problem that dictionary information necessary for users can not be offered to the users timely.

In the translation processing, since users access a dictionary frequently, a dictionary access speed considerably affects a processing speed. In the internet, it cannot be expected that its line speed is higher than that of a LAN (local area network) so that, when the user accesses a plurality of dictionaries via the internet during the translation processing, the translation cannot be completed at high speed. Furthermore, at present to connect a client computer installed on a home user to the internet, it is necessary to use a line such as a telephone line of which the line speed is very low as compared with that of the LAN. As a consequence, it takes a lot of time for the home user to access the dictionaries through the network, which is not suitable in actual practice.

SUMMARY OF THE INVENTION

In view of the aforesaid aspect, it is an object of the present invention to provide a dictionary server in which a cost for retrieving desired dictionary information can be suppressed by executing retrieval requests in the sequential order of high priorities given to other dictionary servers having dictionary information of a dictionary entry or other dictionary servers having a large possibility that they will have dictionary information of a dictionary entry if the dictionary entry of retrieval request does not exist on the dictionary server at the time a dictionary information retrieval request is issued.

It is another object of the present invention to provide a recording medium for use with a general information processing apparatus and which can be read by a computer system which stores therein processing procedures (a set of programs and command codes) and necessary data for translating a natural language into other natural language in a machine translation fashion.

It is a further object of the present invention to provide a machine translation method in which a translated sentence of a high quality can be created by retrieving dictionary information through a network even if a processing speed of a dictionary retrieval through the network is not sufficient when a client executes a translation processing.

It is yet a further object of the present invention to provide a dictionary information collection method for a dictionary server in which a dictionary constructing work is supported by preparing an unknown word having a large possibility that it will be requested to be retrieved before a client issues a dictionary information retrieval request in the dictionary server so that a responsiveness obtained at the time the dictionary information retrieval request is issued can be made at a high speed.

According to the present invention, there is provided a machine translation method of translating a document by using a translation knowledge. The machine translation method comprises the steps of transmitting an inquiry for inquiring a translation knowledge used to translate a syntactic unit containing an unknown word and having a correct grammar to a network when an unknown word that cannot be translated is recognized during a document is translated, continuing translating a syntax following the syntactic unit, and completing the translation of the syntactic unit by using an answer when the answer to the inquiry is received.

The inquiry step may include a first sub-step of outputting the syntactic unit translated in the form of having the unknown word temporarily processed when the unknown word that cannot be translated is recognized, and the syntax completion step may include a second sub-step of outputting the syntactic unit in which the unknown word in the syntactic unit is translated by using the received answer.

The first sub-step may include a sub-step of translating the syntactic unit having the correct grammar into the syntactic unit translated in the form of having the unknown word temporarily processed by estimating a part of speech to which the unknown word belongs. The second step may include a sub-step of comparing the estimated part of speech with a part of speech of the unknown word contained in the answer, translating the unknown word if they agree with each other, and translating again the syntactic unit based on the answer if they do not agree with each other.

According to the present invention, it is possible to provide a retrieval method of retrieving a dictionary stored in a storage in response to a request in an information processing apparatus connected to a network. The retrieval method comprises the steps of retrieving the dictionary of the information processing apparatus when a dictionary retrieval request concerning a dictionary entry of a document is received and transmitting a retrieval request from the information processing apparatus to the network when the dictionary entry does not exist in the dictionary. The transmission step may include a step of determining a transmission destination to which the retrieval request is transmitted based on priorities supplied to a plurality of other dictionary servers by retrieval results received to a plurality of past retrieval requests and a field of the dictionary entry.

In order to construct a dictionary, there may be executed a step of determining importance of a plurality of documents based on respective frequencies of retrieval requests to a plurality of documents on a network, a step of retrieving an important document from a plurality of documents in order to recognize an unknown word, a step of outputting an important unknown word to an output apparatus together with an input request of a corresponding equivalent and a step of memorizing the equivalent inputted on the output apparatus in the dictionary.

Furthermore, according to the present invention, it is possible to provide a computer readable storage medium for use with an information processing apparatus connected to a network for translating a document by using a translation knowledge. According to the present invention, the computer readable storage medium may include a command code for transmitting an inquiry for inquiring a translation knowledge used to translate a syntactic unit containing an unknown word and having a correct grammar to the network when the unknown word that cannot be translated is recognized during a document is translated, a command code for continuing translating a syntax following the syntactic unit, and a command code for completing the translation of the syntactic unit by using an answer when the answer to the inquiry is received.

BRIEF DESCRIPTION OF THE DRAWINGS

FIG. 2 is a conceptual diagram of a URL (uniform resource location) translation frequency list;

FIG. 3 is a conceptual diagram of a distributed dictionary index;

FIG. 7 is a flowchart to which reference will be made in explaining the manner in which dictionary information is collected;

FIG. 8 is a conceptual diagram of retrieval request data;

FIG. 11 is a diagram showing an example of a dictionary entry estimation rule;

FIG. 14 is a conceptual diagram of a dictionary server evaluation list;

FIG. 15 is a conceptual diagram of a most suitable dictionary server table;

FIG. 23 is a diagram showing an example of a syntactic ambiguity;

FIG. 24 is a flowchart to which reference will be made in explaining a processing done by the client side in a processing for creating a dictionary corresponding to URL;

DETAILED DESCRIPTION OF THE PREFERRED EMBODIMENT

The present invention will now be described with reference to the drawings.

(a) Overall Arrangement of the System

Figure 1:
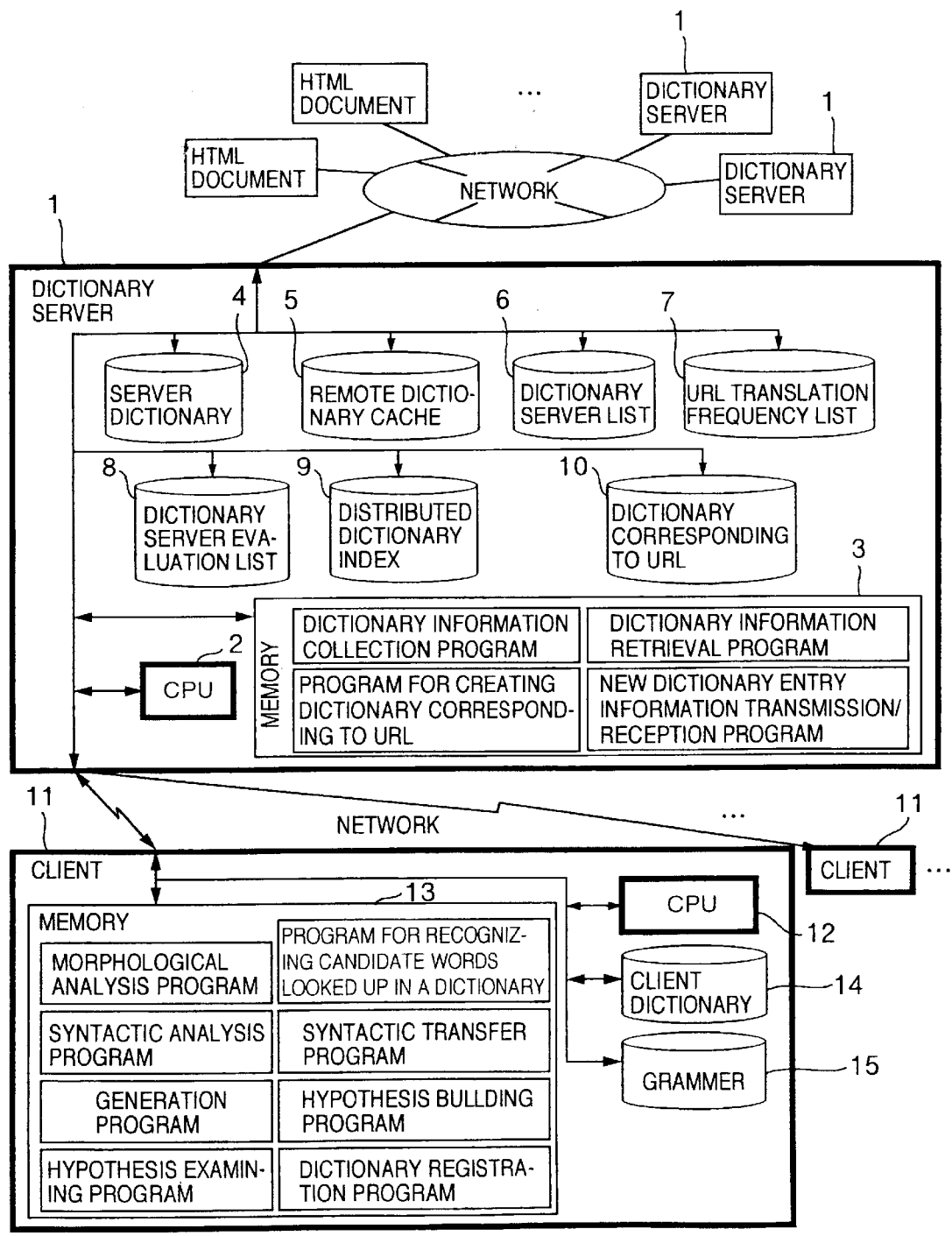
FIG. 1 is a functional block diagram showing the whole system according to an embodiment of the present invention.

FIG. 1 of the accompanying drawings is a functional block diagram showing an overall arrangement of an embodiment according to the present invention.

As shown in FIG. 1, a plurality of servers 1 and a plurality of clients 11 are connected to a network. Each of the clients 11 is able to execute a translation processing alone by using a client dictionary 14 and a grammar 15. Further, when a translation is executed, the client 11 requests the dictionary server 1 to retrieve dictionary information concerning dictionary entries which do not exist on the client dictionary 14, and executes a translation by using both returned dictionary information and the client dictionary 14. The dictionary server 1 receives dictionary information retrieval request concerning a certain dictionary entry from the client 11, and returns dictionary information concerning the above dictionary entry to the client 11.

The dictionary server 1 will be described below. A CPU (central processing unit) 2 accesses a memory 3 and various kinds of files, and executes the processing. The memory 3 stores therein programs which are used to execute a variety of processing on the dictionary server 1.

A server dictionary 4 is a translation dictionary provided in the dictionary server 1. When the client 11 issues a dictionary information retrieval request, this server dictionary 4 is retrieved initially. While only one server dictionary 4 is provided as described above, in actual practice, there may be provided a plurality of server dictionaries 4 over a plurality of files.

A remote dictionary cache 5 is a dictionary file in which there are stored retrieval results from other dictionary servers 4 existing on the network. If the remote dictionary cache 5 is used, then when a retrieval request for the same dictionary entry is issued again, it is possible to obtain dictionary information without issuing a retrieval request to other dictionary server 1.

A dictionary server list 6 is a list of other dictionary servers existing on the network. However, all of other dictionary servers on the network need not always be described in the dictionary server list 6.

A URL translation frequency list 7 represents a frequency at which URL used as ID of HTML document is requested to be translated and each URL is requested to be translated per unit time. FIG. 2 shows an example of a URL translation frequency list. In the case of FIG. 2, there is shown a frequency of a translation request per day. Specifically, with respect to URL "http://info.../robots.html" of 1, 60 translation requests are made on X month and Y day.

A dictionary server evaluation list 8 stores therein history information concerning past retrieval requests at every dictionary server in the dictionary server list 6.

A distributed dictionary index 9 is an index file which manages dictionary entry information of the server dictionary 4, the remote dictionary cache 5 and other server dictionary and dictionary information of its own dictionary. FIG. 3 shows a structure of the distributed dictionary index 9. As shown in FIG. 3, the distributed dictionary index 9 comprises dictionary entries and dictionary information pointers indicative of places in which dictionary information for each dictionary entry is stored. The dictionary information pointer comprises a dictionary information pointer classification and a pointer value. The dictionary information pointer classification shows a place where dictionary information is stored. The dictionary information pointer classification is L in the case of the server dictionary 4, C in the case of the remote dictionary cache 5 and R in other cases. A meaning of the pointer value changes depending on the classification of the dictionary information pointer. When the classification is L, for example, the dictionary information pointer shows a byte position of dictionary data in a local dictionary. When the classification is C, the dictionary information pointer shows a byte position of dictionary data in the remote dictionary cache 5. When the classification is R, the dictionary information pointer shows a dictionary server ID (Internet Protocol (IP) address). In the case of the dictionary entry "Big Blue", for example, dictionary information is stored in two places. One is stored as data which begins with the position of 44825 bytes from the beginning of the remote dictionary cache 5. Another one is stored in the dictionary server of which the IP address is 133.144.18.152.

A dictionary 10 corresponding to URL is a dictionary on which there is registered individual information containing dictionary entry and equivalents at every URL. In the case of dictionary entry having a plurality of equivalents in Japanese such as president→"大統領" (DAITORYO, in English, the president), "社長" (SHATYO, person selected so as to lead a group), if the president in a certain URL is used as a meaning of only "社長", dictionary information of president→"社長" is stored in this dictionary 10 corresponding to URL.

Also in this client 11, the CPU 12 accesses the memory 13 and the file, and executes the processing similarly to the dictionary server 1. On the memory 13, there are stored programs and data that are used to execute a translation on the client 11 side. A client dictionary 14 and a grammar 15 are data used in the translation processing. Dictionary information retrieved from the dictionary server 1 is stored in the client dictionary 14. Thus, when the same word appears later on, a retrieval request for the dictionary server 1 becomes unnecessary. Moreover, it becomes possible to obtain information of a word required by a user free from a fixed classification such as a field.

(b) To Collect Unknown Words in the Dictionary Server

A method of managing dictionary information in the dictionary server 1 will be described next. Each of the dictionary servers 1 is adapted to exchange information between it and other dictionary server via the network in order to manage dictionary information. In this embodiment, information is exchanged between the dictionary servers according to the following two kinds of modes.

As a first mode, there will be described the manner in which a new dictionary entry is transmitted and received between the dictionary servers 1. Each dictionary server 1 is able to transmit a new dictionary entry registered on the server dictionary 4 to other dictionary server. A dictionary server to which the new dictionary entry is transmitted is able to decide a dictionary entry with reference to the dictionary server list 6. A dictionary server which received the new dictionary entry information is able to learn an ID of a dictionary server which holds the dictionary entry and the equivalent.

The manner in which the dictionary server transmits additional dictionary entry information will be described with reference to FIG. 4.

Figure 4:
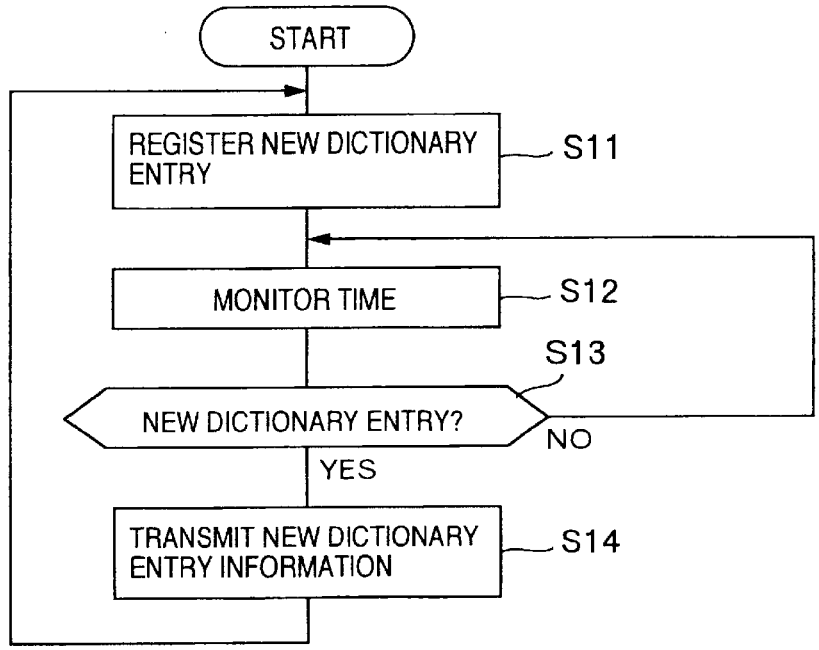
FIG. 4 is a flowchart to which reference will be made in explaining the manner in which new dictionary entry information is transmitted.
Figure 5:
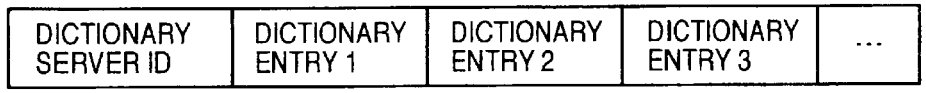
FIG. 5 is a conceptual diagram of new dictionary entry information.

Referring to FIG. 4, when the registration of dictionary information indicative of a new dictionary entry occurs in the server dictionary 4, the dictionary server 1 registers the new dictionary entry in a new dictionary entry list (not shown) (step S11). When a new dictionary entry is registered on the server dictionary 4, instead of registering each dictionary information at every registration, dictionary information of a predetermined number may be registered or dictionary information may be registered in accordance with a timer (not shown). A new dictionary entry may be registered by a manager of the dictionary server or a dictionary created by a user may be registered on the dictionary server. A new dictionary entry information transmission and reception program loaded onto the memory 3 is activated at every constant time by the timer (step S12). Then, it is determined whether or not a dictionary entry is registered on the new dictionary entry list (step S13). If the dictionary entry is already registered on the new dictionary entry list as represented by a YES at the decision step S13, then the new dictionary entry information transmission and reception program transmits new dictionary entry information to the dictionary server in the dictionary server list 6 (step S14). The new dictionary entry information has a structure shown in FIG. 5. As shown in FIG. 5, a dictionary server ID is an ID number (IP address) of a dictionary server which transmitted the new dictionary entry information, which is followed by the dictionary entry list of new dictionary entries.

Figure 6:
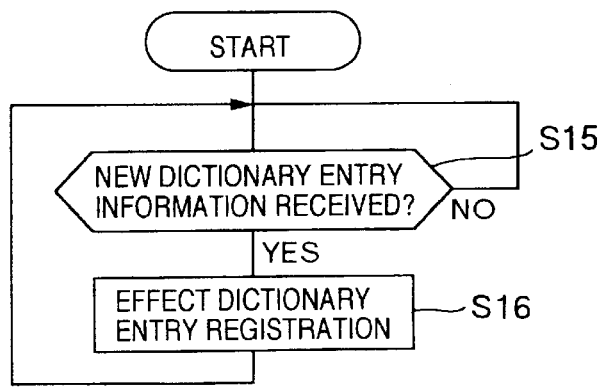
FIG. 6 is a flowchart to which reference will be made in explaining the manner in which new dictionary entry information is received.

An arbitrary dictionary server executes a new dictionary entry reception processing and registers a dictionary entry in accordance with a procedure shown in FIG. 6.

Referring to FIG. 6, following the start of operation, it is determined by other dictionary server at the next decision step S15 whether or not transmitted registered dictionary entry information is received. If the transmitted registered dictionary entry information is received as represented by a YES at the decision step S15, then other dictionary server executes a dictionary entry registration processing (step S16). Specifically, the dictionary server compares the received new dictionary entry information with the dictionary. If it is determined that the new dictionary entry is an unknown word, then a dictionary entry and the ID number of the server in the new dictionary entry information are stored in the distributed dictionary index 9. In this manner, each dictionary server is able to learn dictionary entry information of dictionaries of a plurality of other dictionary servers distributed and connected to the system. At that time, for the dictionary server which receives the new dictionary entry information, new dictionary entry information is only the dictionary entry and the IP address of the internet protocol. Thus, as compared with the case in which new dictionary entry information containing equivalents, a discrimination of a part of speech, a semantic or syntactic attribute and a field of a dictionary entry is registered, it is frequently observed that the dictionary server may save a dictionary capacity. Moreover, the dictionary server which transmits new dictionary entry information is able to prevent information of equivalent, which is newly registered by the above dictionary server, from being duplicated without permission. Thus, the present invention may be applied to the case in which an accounting for communicating an equivalent, a part of speech, an attribute and a field is executed between the dictionary servers.

As a second mode, there will be described a processing for collecting dictionary information on the dictionary server. According to the dictionary information collection processing, a word having a large possibility that it will be used from now on is automatically estimated by using statistical information concerning URL translation frequency that has been accumulated in the past, and other dictionary server having a large possibility that it will have dictionary information of the estimated word is automatically estimated by using statistical information accumulated concerning other servers, whereby necessary dictionary information can be collected while suppressing a communication cost.

The whole of the dictionary information collection processing will hereinafter be described with reference to FIG. 7.

Referring to FIG. 7, and following the start of operation, a dictionary information collection program may be activated at every constant time by monitoring a time with the timer (step S21). The dictionary information collection program predicts based on the URL translation frequency list 7 a translation frequency document having a possibility that it will be translated from now on (step S22). The dictionary information collection program is able to predict the translation frequency document based on the result obtained when the frequency of dictionary retrieval requests issued by the document to the URL is analyzed statistically. In the embodiment according to this invention, the following two prediction methods will be described, for example.

(a) URL in which an average of dictionary retrieval request frequency per unit time is greater than a threshold value; and (b) URL in which a rate of change of dictionary retrieval request frequency per unit time is greater than a threshold value.

The method (a) is a method of selecting a document of which the translation is constantly and frequently requested such as a home page of a certain magazine which is popular continuously. The method (b) is a method of selecting a newly provided URL which is considerably popular.

While the URL which is greater than the threshold value is selected as described above, the present invention is not limited thereto, and other methods of selecting URLs which are previously determined in the sequential order of high average of translation frequencies and high rate of change may be used. In addition to the translation frequency in actual practice, code (e.g. −1) indicative of highest priority is set on the URL translation frequency list in a manual fashion, and the above-mentioned code may be constantly used as a target of the unknown word collection processing regardless of the translation frequency in actual practice.

While the document having the large possibility that it will be translated from now on is predicted based on the frequency of the translation request to the URL as described above, the present invention is not limited thereto, and the dictionary server may be served also as proxy server of WWW. In this case, since frequency information of access to the URL may be obtained, a similar processing may be executed based on the access frequency information and information indicative of a language of the HTML document.

Then, a URL having a high translation frequency is selected, and an HTML document corresponding to the URL is obtained (step S23). While an example in which the whole of this document is obtained will be described herein, the present invention is not limited thereto, and other methods such as a method in which an HTML document obtained in the previous access is saved, a difference between the above HTML document and this HTML document is calculated and only a newly added portion is to be processed or a method in which an HTML document indicated by a previously-determined character string (e.g. "What's New!", etc.) is obtained and may be used as a processing target.

After the HTML document is obtained, candidate words, or words subject to a process of retrieving to other dictionary servers, looked up in a dictionary in that document are determined (step S24). The candidate words looked up in a dictionary are words appearing in the HTML document thus obtained and of which accurate dictionary information cannot be obtained from the server dictionary 4. The following three cases will be described.

(a) In the case where words are not registered in a dictionary: words called unknown words in a machine translation;

(b) In the case of proper nouns: although they are registered on a dictionary as words, they have a special meaning; and (c) In the case of compound words: although they are individually registered on a dictionary, compound words have a special meaning. With respect to a compound word of Big Apple (New York), big and apple are registered on a dictionary but a compound word "Big Apple" is not registered on the dictionary.

Figures 9, 10:
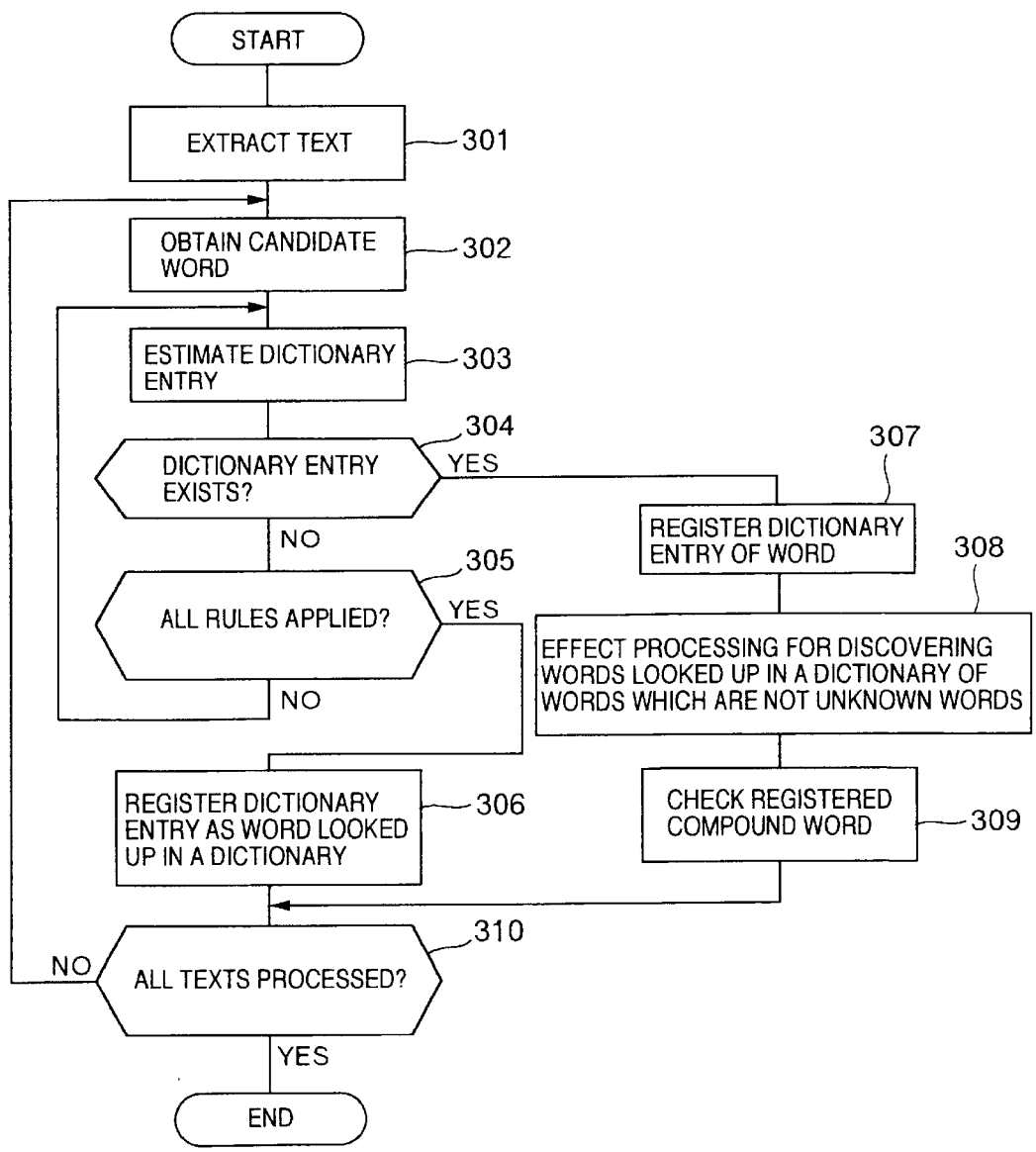
FIG. 9 is a conceptual diagram of transmitting data of retrieval result.
FIG. 10 is a flowchart to which reference will be made in explaining the manner in which candidate words looked up in a dictionary are extracted.

The manner in which candidate words looked up in a dictionary are selected will be described more in detail later on (FIG. 10).

After the candidate words looked up in a dictionary are determined at the step S24, then control goes to the next step S25, whereat priorities of other dictionary servers are determined. The step S25 will be described more in detail later on.

A retrieval request of dictionary information concerning candidate words looked up in a dictionary is issued to other dictionary servers in accordance with the determined priorities (step S26). FIG. 8 shows a structure of retrieval request data used at the step S26. As shown in FIG. 8, the retrieval request data comprises a destination of retrieval request, a retrieval depth, a dictionary entry, a URL and a time of retrieval request issued. There are provided two kinds of destination of retrieval request, i.e. L and R. When the destination of retrieval request is L, dictionaries on the dictionary servers which receive the retrieval request, i.e. only the server dictionary and the remote dictionary cache 5 are used as destinations of retrieval request. When the destination of retrieval request is R, both of dictionary on the dictionary server which receives the retrieval request and other dictionary server are used as destinations of retrieval request. The retrieval depth indicates the number of dictionary servers through which the retrieval request is issued in response to the dictionary retrieval request from a certain client. Assuming now that a certain dictionary server issues retrieval requests to n dictionary servers on average, then the number of dictionary servers which receive the retrieval requests becomes the order of the exponential function of the retrieval depth, thereby rapidly increasing a traffic. Therefore, the user is inhibited from issuing a retrieval request of which the retrieval depth is greater than a predetermined value. The dictionary entry is a character string of a dictionary entry which becomes a destination of retrieval request. When a document to be translated is an HTML document on the network, a URL of such document is stored in the URL. In other cases, a default is set in the URL. In the time of retrieval request issued, there is stored a time in which the first retrieval is executed by the client with respect to the dictionary entry. A retrieval request of which the time elapses by a predetermined time from the first retrieval is discarded. Alternatively, the time of retrieval request issued is not limited to the time in which the client issues the retrieval request but a deadline to return a retrieval result may be set and a retrieval request which did not meet the deadline may be discarded.

When the retrieval result returned data obtained at the step S26 is received and the retrieval is successful, dictionary data is updated (step 27). FIG. 9 shows a structure of the retrieval result returned data. As shown in FIG. 9, the retrieval result returned data comprises a dictionary server name, a success flag, a contents classification, an encipherment flag and dictionary information. The dictionary server name is a dictionary server ID in which there is stored this dictionary information. The success flag is a flag indicating whether or not the retrieval is successful. The contents classification represents contents classification of dictionary information. When the contents classification is E, it represents only that the dictionary entry exists in the dictionary server indicated by the dictionary server ID. When the contents classification is C, it represents that dictionary information concerning the dictionary entry itself is obtained. The encipherment flag is a flag which indicates whether or not this dictionary information is enciphered.

When the retrieval is successful, the following three processings are executed. Firstly, when other dictionary server transmits dictionary information which is not enciphered, data which results from copying dictionary information is stored in the remote dictionary cache 5, and the distributed dictionary index 9 is updated. Secondly, when only data indicative of the existence of dictionary information concerning the dictionary entry is transmitted, the dictionary entry is added to the distributed dictionary index 9, and the dictionary server name is stored as a pointer for identification.

Thirdly, when enciphered dictionary information is obtained, data is stored in the remote dictionary cache 5 or data is discarded. When it is clear that the user of the client has a key for decoding enciphered dictionary information, e.g. when it is previously determined that the dictionary servers exchange dictionary information there-between, if the enciphered data is held as it is and dictionary information is transmitted together with the dictionary server ID in accordance with the retrieval request from the client, then the dictionary information decoded on the client side can be utilized. In other cases, dictionary information cannot be utilized, and hence data is discarded.

Referring back to FIG. 7, it is determined at a decision step S28 whether or not all URLs are processed. If all URLs are not processed as represented by a NO at the decision step S28, then control goes back to the step S23, whereat the step S23 and the following steps are repeated. If on the other hand all URLs are processed as represented by a YES at the decision step S28, then control goes back to the step S21. According to the above-mentioned processing, it is possible to obtain dictionary information concerning a word which does not exist in the dictionary server and which has a large possibility that it will be required for the translation from now on.

The manner in which candidate words looked up in a dictionary are selected (step S24 in FIG. 7) will hereinafter be described in detail with reference to FIG. 10.

In the processing in which candidate words looked up in a dictionary are selected, while the server dictionary is being retrieved, candidate words looked up in a dictionary are selected by executing a morphological analysis. While a simple method using a blank as a pause between words will be described because the embodiment of the present invention is applied to English, the present invention may be applied to a morphological analysis processing method described in Japanese laid-open patent application No. 58-40684.

Referring to FIG. 10, and following the start of operation, an HTML tag is deleted from the HTML document and only a character string which becomes a target of the processing for selecting candidate words looked up in a dictionary is extracted from the HTML document (step S301).

If characters such as blank, period or comma are discovered by searching the extracted character string to be processed, a character string ranging from the immediately-preceding blank character to the present blank character is extracted as a candidate word (step S302).

A candidate word of a dictionary entry is estimated from the extracted word (step S303). In that case, a rule shown in FIG. 11 is used. When a word is a word having a regular inflection, it is general that only a root form of such word is registered as a dictionary entry. Therefore, if the extracted word is an inflection form of a word which regularly changes, then the extracted word is not registered as a dictionary entry. With respect to the irregular verb, its inflection form is also registered as a dictionary entry.

Then, it is determined whether or not the candidate word of the dictionary entry is registered on the dictionary (step S304). If the candidate word of the dictionary entry is registered on the dictionary as represented by a YES at the decision step S304, then control goes to a step S307.

If on the other hand the candidate word of the dictionary entry is not registered on the dictionary as represented by a NO at the decision step S304, then control goes to the next decision step S305, whereat it is determined whether or not all dictionary entry estimation rules are applied. If all dictionary entry estimation rules are not yet applied as represented by a NO at the decision step S305, then control goes back to the step S303, whereat the processing for estimating the candidate word of the dictionary entry is repeated. If on the other hand all rules are already applied as represented by a YES at the decision step S305, then it is determined that the candidate word of the dictionary entry is a candidate word looked up in a dictionary. Then, the dictionary entry is registered on the dictionary as the candidate word looked up in a dictionary (step S306).

Then, the dictionary entry of the word thus obtained is registered on a word table (not shown) (step S307). The word table is a table in which dictionary entries of words contained in the sentence which is now being processed are stored in the sequential order of the appearance.

Figure 12:
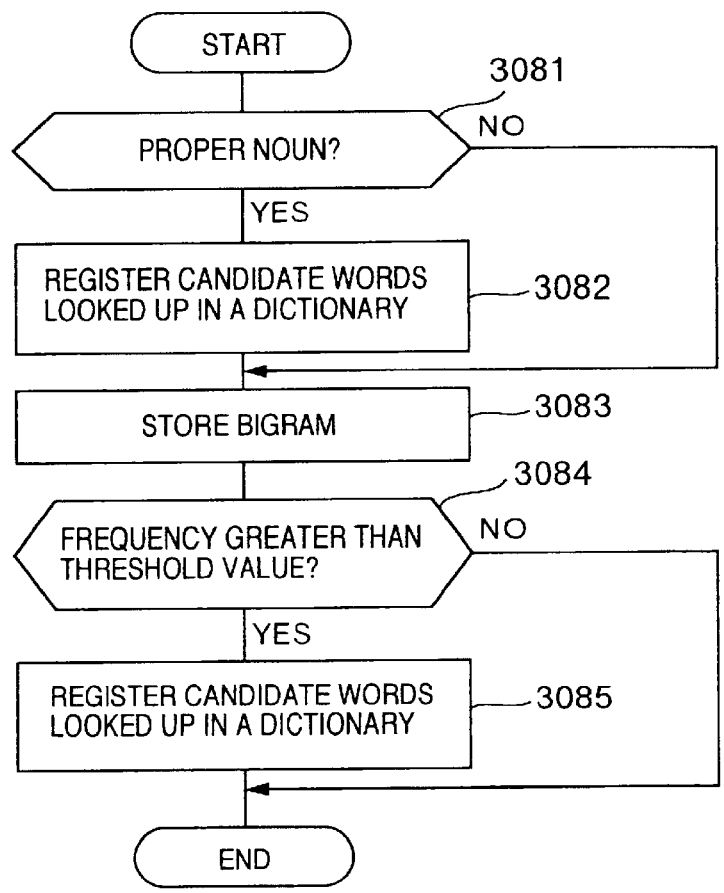
FIG. 12 is a flowchart to which reference will be made in explaining the manner in which candidate words looked up in a dictionary are discovered.
Figure 13:
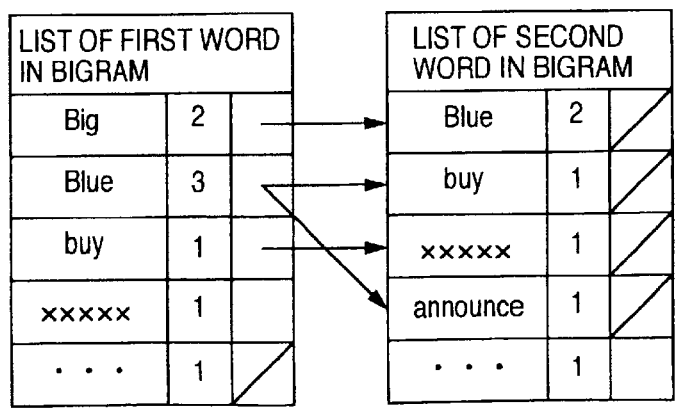
FIG. 13 is a conceptual diagram of a data structure for holding bigram.

Then, a candidate word of the candidate words, such as a compound word and a proper noun, looked up in a dictionary and which is not an unknown word is extracted (step S308). This processing will be described more fully later on (FIGS. 12 and 13).

When the candidate words looked up in a dictionary are compound words, it is determined whether or not the candidate words looked up in a dictionary are already registered. If the compound words are already registered, then the compound words are deleted from the list of candidate words looked up in a dictionary (step S309).

Then, it is determined at the next decision step S310 whether or not all texts are already processed. If there are texts that are not yet processed as represented by a NO at the decision step S310, then control goes back to the step S302 and the following steps are repeated. If all texts are already processed as represented by a YES at the decision step S310, then control is ended.

Then, the processing for discovering candidate words looked up in a dictionary and which are not unknown words (step S308 in FIG. 10) will be described more in detail with reference to FIG. 12.

Referring to FIG. 12, and following the start of operation, it is determined at the next decision step S3081 whether or not the dictionary entry is a proper noun. When a word is located at the position other than the beginning of a sentence, if the character string of the dictionary entry in the text is a capital letter, then it is determined that the word is a proper noun. If not, then it is determined that the word is not a proper noun.

If it is determined at the decision step S3081 that the dictionary entry is the proper noun, then the dictionary entry is registered as a candidate word of candidate words looked up in a dictionary (step S3082).

Then, the dictionary entry and a word which appears immediately before the dictionary entry are stored as bigram (step S3083). FIG. 13 is a conceptual diagram showing a bigram storing table. The bigram storing table stores all of adjacent bigrams in the text together with frequencies. The bigram storing table comprises a list of first word in bigram and a list of second word in bigram. A list of ith word in bigram comprises a character string of a word which appears ith of bigram, a frequency of a word string up to ith word and a pointer of i+th word of i+1th word string which follows the word string of ith word. In the case of FIG. 13, for example, it is to be understood from the list of first word in bigram that "Big" appears twice. Also, having searched the pointer of "Big", it is to be understood that "Big Blue" appears twice as a bigram which begins with "Big".

Referring back to FIG. 12, the frequency of the discovered bigram is counted (step S3084). If the frequency is greater than a predetermined threshold value, then the bigram is registered as candidate words looked up in a dictionary (step S3085).

The processing for determining priority of other dictionary server at the step S25 in FIG. 7 will be described next.

If the dictionary entry does not exist in its own server dictionary, the dictionary server according to the present invention issues a dictionary entry retrieval request to other dictionary server so that the dictionary server according to the present invention may use dictionaries distributed on the network. At that time, if it is clear which dictionary server the retrieved dictionary entry exists, i.e. the dictionary entry exists in the distributed dictionary index 9, the dictionary server issues the retrieval request to such dictionary server. However, if the dictionary server having dictionary information of dictionary entry is not clear, i.e. the dictionary entry does not exist in the distributed dictionary index 9, then the dictionary server according to the present invention makes an inquiry to other dictionary servers in the dictionary server list 6. At that time, when the dictionary server makes an inquiry to an arbitrary dictionary server in the dictionary server list 6, a retrieval efficiency is considerably low. Also, when each dictionary server makes an inquiry to a plurality of dictionary servers at the same time, a traffic increases exponentially, which causes a serious problem. Therefore, it is prepared that the dictionary server according to this embodiment is provided with a function to determine a priority of a dictionary server when a document which is a translation target is translated, and makes an inquiry in the sequential order of high priority.

The processing for determining the priorities of the dictionary servers is executed by the following three methods.

According to a first method, the dictionary server is determined by using the dictionary server evaluation list 8. FIG. 14 shows an example of the dictionary server evaluation list 8. The dictionary server evaluation list 8 stores histories of results about the past retrieval requests issued to the respective dictionary servers on the dictionary server list 6. In this embodiment, as the histories, there are stored a retrieval frequency indicative of the frequency of retrieval requests, a success frequency indicative of the frequency of successful retrievals and an equivalent alteration frequency indicative of the frequency at which the retrieved equivalent is altered by the user. The following value is calculated with respect to the respective dictionary servers, and the dictionary servers are retrieved in the sequential order of the following value.

$$(\text{evaluated value}) = (\text{success frequency}) * ((\text{retrieval frequency}) - (\text{equivalent alteration frequency}))/(\text{retrieval frequency})^2$$

According to a second method, there is determined a dictionary server which is particularly suitable for translating the HTML document which was already obtained and became a target to be processed. The HTML document to be processed is extracted from the URL column of the retrieval request data. At the step S307 in FIG. 10, when the dictionary entry is registered on the word table, by searching the distributed dictionary index 9, a most suitable dictionary server table is created in response to a word of which dictionary information exists in the remote dictionary cache 5 or other dictionary server. FIG. 15 shows an example of the most suitable dictionary server table. The dictionary server table shows the dictionary server ID and the frequencies at which words stored in each dictionary server appear in the HTML document. Accordingly, it is possible to estimate a dictionary server which contains much more words of the target HTML document. Thus, with reference to this most suitable dictionary server table, words are retrieved in the sequential order of high frequency.

According to a third method, similarly to the second method, there is determined a dictionary server which is most suitable for translating an HTML document which is to be processed at present. After the fields in which words are in use are stored in a dictionary, at the step S307, their fields are extracted with respect to words of which the dictionary entries exist in the server dictionary, and the field of the whole text is judged. Then, similarly to the first method, the retrieval frequency, the success frequency and the equivalent frequency relative to the dictionary server are stored at every field of the document. Then, when a dictionary information retrieval request relative to a new document is issued, initially, the field of the document is judged, and a dictionary server having a largest possibility that the retrieval will become successful in that field is selected. The possibility that the retrieval will become successful can be calculated at every field by the aforementioned equation of the first method.

The manner in which the dictionary server automatically collects the unknown words has been described so far. According to the above-mentioned processing, while a communication cost is being suppressed, it is possible to collect information of a word having a large possibility of being used from now on from unknown words which do not exist in the dictionary server. Also, there is increased the possibility that the user of the dictionary server will be able to obtain dictionary information only from the dictionary server accessed by the user. Thus, it is possible to suppress a communication cost required to look up other dictionary servers.

(c) Machine Translation

A machine translation method using a dictionary server will be described. In the machine translation method according to this embodiment, during a translation is executed, the client side recognizes a portion which cannot be translated such as an unknown word by using a dictionary and a grammar and also issues a retrieval request of a translation knowledge such as dictionary information to the dictionary server which has been described so far. At that time, dictionary information is not always returned from the dictionary server immediately. Therefore, the client side sets a hypothesis about information necessary for the translation with respect to the portion which cannot be translated such as an unknown word, executes a translation based on the hypothesis, and displays a translated result. At the time the translation knowledge such as the dictionary information is returned from the dictionary server to the client side, by changing the translated sentence based on the returned translation knowledge, the client side is able to output a translated result of which the quality is higher than that of a translated result obtained when the client executes a translation alone. Initially, the processing executed on the client side will be described with reference to FIG. 16. By way of example, a case in which a document containing a sentence "135 is FIFO buffer in which memory access requests are latched." is translated will be described hereinafter. In this example, let it be assumed that latch, FIFO are unknown words in the client dictionary 14.

Figure 16:
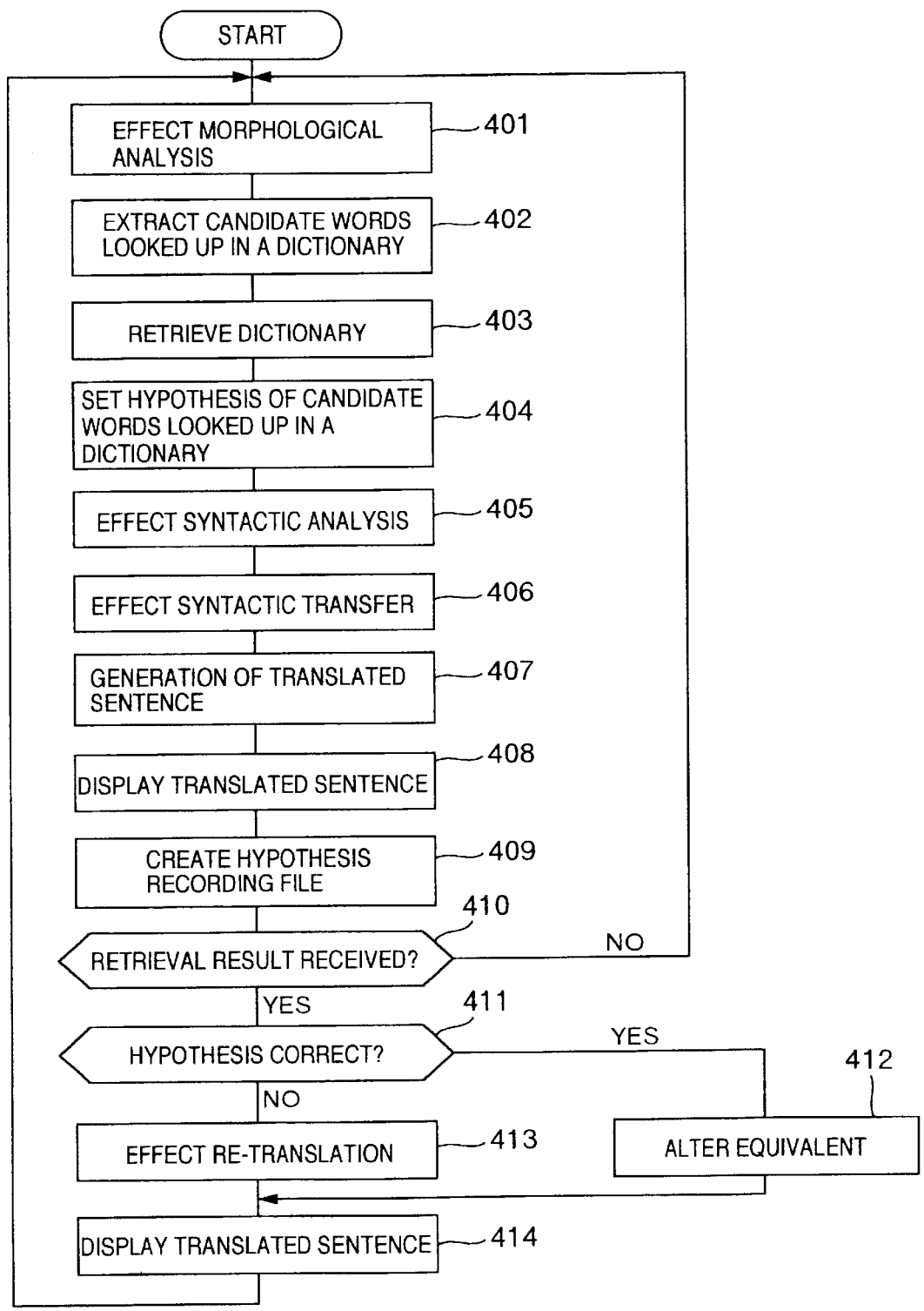
FIG. 16 is a flowchart to which reference will be made in explaining a processing done by a client side in a translation processing.

Referring to FIG. 16, and following the start of operation, an input sequence is analyzed in a morphological analysis fashion by using only the client dictionary 14 (step S401). The morphological analysis is executed by the CPU 12 in accordance with a morphological analysis program stored in the memory 13. In that case, a word which becomes an unknown word is stored in a list of candidate words looked up in a dictionary.

Then, the processing for selecting candidate words looked up in a dictionary is activated (step S402). Contents of this processing are similar to those of the processing executed by the dictionary server at the step S24 in FIG. 7. In the above sentence as an example, FIFO, latch which are unknown words are selected as candidate words looked up in a dictionary.

When the candidate words looked up in a dictionary are selected at the step S402, the client requests a retrieval of dictionary information concerning the candidate words looked up in a dictionary to the dictionary server (step S403). A structure of retrieval request data transmitted to the dictionary server is similar to the data structure (FIG. 8) obtained when the dictionary server requests the retrieval request of the dictionary information to other dictionary server. The entry words (FIFO, latch in the case of this example) which become the retrieval request targets are stored in an issued retrieval request list (not shown). Inquiring the dictionary information of the unknown words to the dictionary server, the client goes on with the translation processing of the document to be translated without awaiting the result of the inquiry.

A processing for setting a hypothesis of candidate words looked up in a dictionary is executed on the translated portions of the unknown words (step S404). This processing enables the translation processing of the sentence containing candidate words looked up in a dictionary to the dictionary server to be executed in an asynchronous fashion with the retrieval to the dictionary server, and is executed by a hypothesis setting program stored in the memory 13. In this processing, results obtained when a part of speech with respect to the candidate words looked up in a dictionary are stored in a word table obtained as a result of the morphological analysis. Then, the translation is executed by using the word table. As a hypothesis setting rule for a part of speech, there is used a rule shown in FIG. 17. The hypothesis setting processing is executed by a combination of the dictionary entry estimation rule shown in FIG. 11 and the hypothesis setting rule shown in FIG. 17. Specifically, a dictionary entry is estimated by the dictionary entry estimation rule, and it is checked whether or not the hypothesis setting rule can be applied to the dictionary entry. In the above-mentioned example, in the case of "FIFO", this word "FIFO" is not matched with the rules indicative of adverb, adjective and verb of FIG. 17, and a hypothesis of noun is set based on other conditions. According to a similar processing, in the case of "latched", there is set a hypothesis of a past form of a verb.

When the hypothesis is set, a syntactic analysis (step S405), a syntactic transfer (step S406) and a generation processing (step S407) are executed by using the hypothesis, thereby resulting in a translated sentence being obtained. To be concrete, the CPU 12 executes the processing in accordance with a syntactic analysis program, a syntactic transfer program and a generation program stored in the memory 13.

Figures 17, 18:
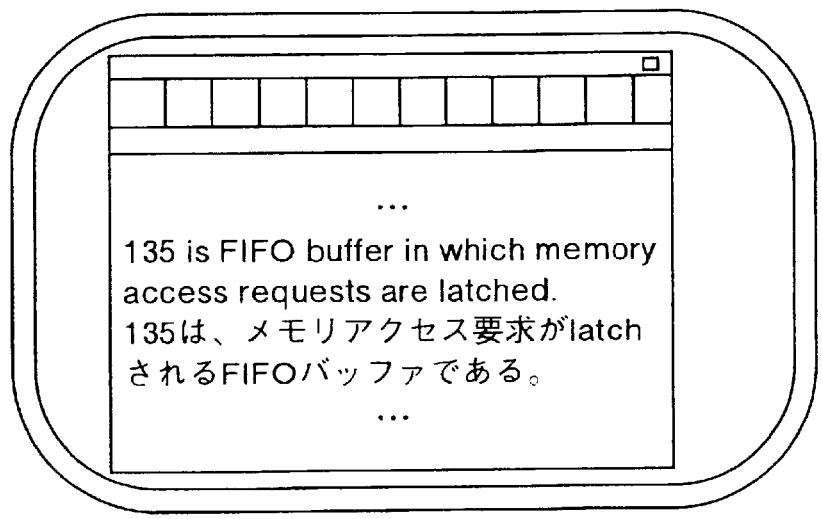
FIG. 17 is a diagram showing an example of a part of speech estimation rule.
FIG. 18 is a diagram showing an example of a picture containing an unknown portion displayed on a screen.

At that time, since "FIFO" and "latched" are unknown words so that a complete translated sentence cannot be obtained, a translated sentence containing words that are not yet translated is displayed as shown in FIG. 18 (step S408). In FIG. 18, the portions of "FIFO" and "latched" may be displayed as blanks or symbols. Moreover, the portions of "FIFO" and "latched" are emphasized in display in order to indicate a fact that the dictionary retrieval request is now being issued to the dictionary server.

Figures 19, 20:
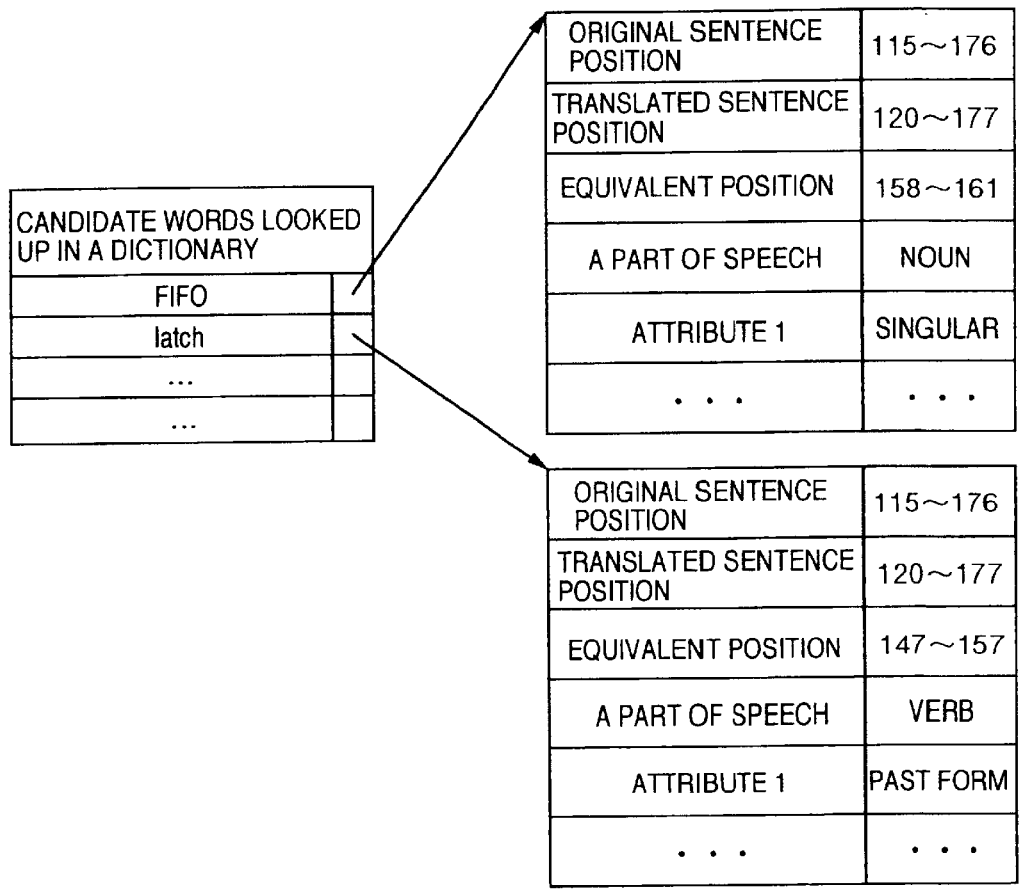
FIG. 19 is a conceptual diagram of a hypothesis recording file.
FIG. 20 is a conceptual diagram of an encrypt key table.

Then, there is created a hypothesis recording file (step S409). The hypothesis recording file is a file which stores a hypothesis set with respect to candidate words looked up in a dictionary when a word to be looked up in a dictionary exists in a document to be translated. FIG. 19 shows an example of the hypothesis recording file. The hypothesis recording file stores at every candidate word looked up in a dictionary a position at which a sentence in which a word appears is located in an original sentence file, a position at which a sentence obtained as a translated result is located in a translated sentence file, a position at which an equivalent of a candidate word looked up in a dictionary is located, a part of speech hypothesized, etc. The example of FIG. 19 shows the following thing.

The input sequence "135 is FIFO buffer in which memory access requests are latched." begins with 115-th byte and ends with 176-th byte in the document to be translated. The translated sentence "1 3 5はメモリアクセス要求がlatchされるFIFOバッファである。｡" begins with 120-th byte of translated sentence document and ends with 177-th byte. Moreover, an equivalent "latchされる" of the unknown word of "latched" begins with 147-th byte and ends with 151-byte. The equivalent "FIFO" of the unknown word of "FIFO" begins with 158-th byte and ends with 161-th byte.

Referring back to FIG. 16, it is determined in the next decision step S410 whether or not a retrieval result is received from the dictionary server in response to the retrieval request transmitted to the dictionary server at the step S403. The retrieval result is stored in a temporary dictionary (not shown). The client retrieves a word in the issued retrieval request list by the temporary dictionary. If the word is already stored as the dictionary entry, then it is determined that the retrieval result is already received. A structure of the retrieval result is similar to the data structure (FIG. 9) of the result received relative to the retrieval request transmitted by the dictionary server to other dictionary server. However, it is assumed that the contents classification is constantly C and that dictionary information is stored. When the encipherment flag is held at 0, the dictionary information is copied to the temporary dictionary as it is. When the encipherment flag is held at 1, with reference to an encrypt key table, an encrypt key is obtained from the dictionary server ID of the dictionary server to execute a decoding processing, whereby information obtained after the decoding processing is copied to the temporary dictionary. FIG. 20 shows an example of the encrypt key table. The encrypt key table is a list on which there are stored dictionary-server IDs and encrypt keys necessary for decoding dictionary information from the dictionary server. The encrypt key is obtained in advance when the user of the client makes a contract with a provider of each dictionary server. Thus, each server becomes able to provide dictionary information to only the user of the client which makes a contract with the manager of each dictionary server.

Figure 21:
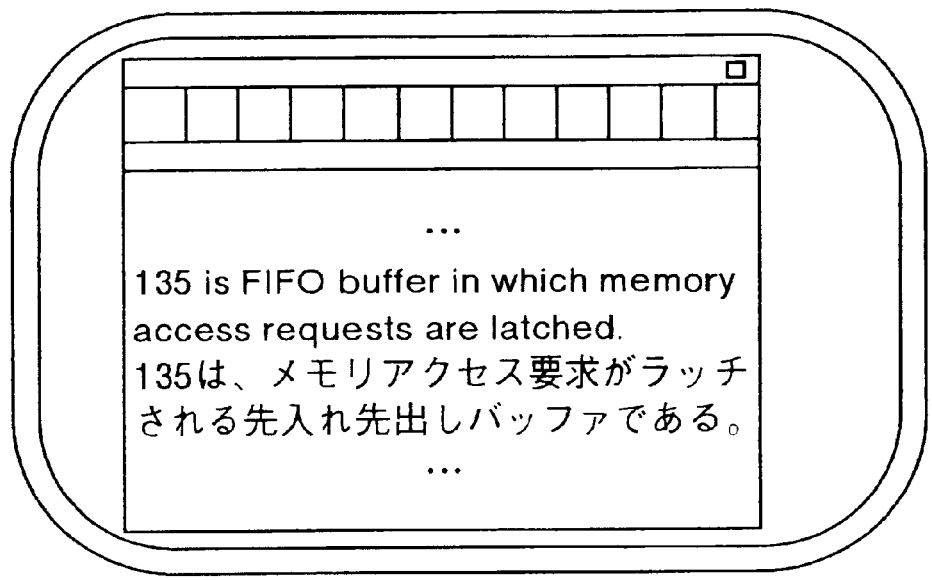
FIG. 21 is a diagram showing an example of a translated sentence displayed on a screen.

If the retrieval result is already received as represented by a YES at the decision step S410, then the hypothesis recording file is looked up by the hypothesis examining program stored in the memory 13, and further the dictionary entry is deleted from the issued retrieval request list (step S411). If the retrieval result is not yet received as represented by a NO at the decision step S411, then control goes back to the step S401, whereat the next sentence is processed. If the hypothesis is correct as represented by a YES at the decision step S411, then control goes to a step S412, whereat the character string position of the equivalent of the candidate word looked up in a dictionary is obtained from the hypothesis recording file, and the retrieved equivalent is replaced with a word having an inflection based on an attribute in the hypothesis recording file. If the hypothesis is incorrect as represented by a NO at the decision step S411, then control goes to a step S413, whereat the sentence is again translated by using the retrieved dictionary information and the whole of the character string of the translated sentence is replaced. Then, control goes to a step S414, whereat the altered translated sentence is displayed on the screen. FIG. 21 shows the translated sentence displayed on the screen.

The processing on the server side will be described with reference to FIG. 22.

Figure 22:
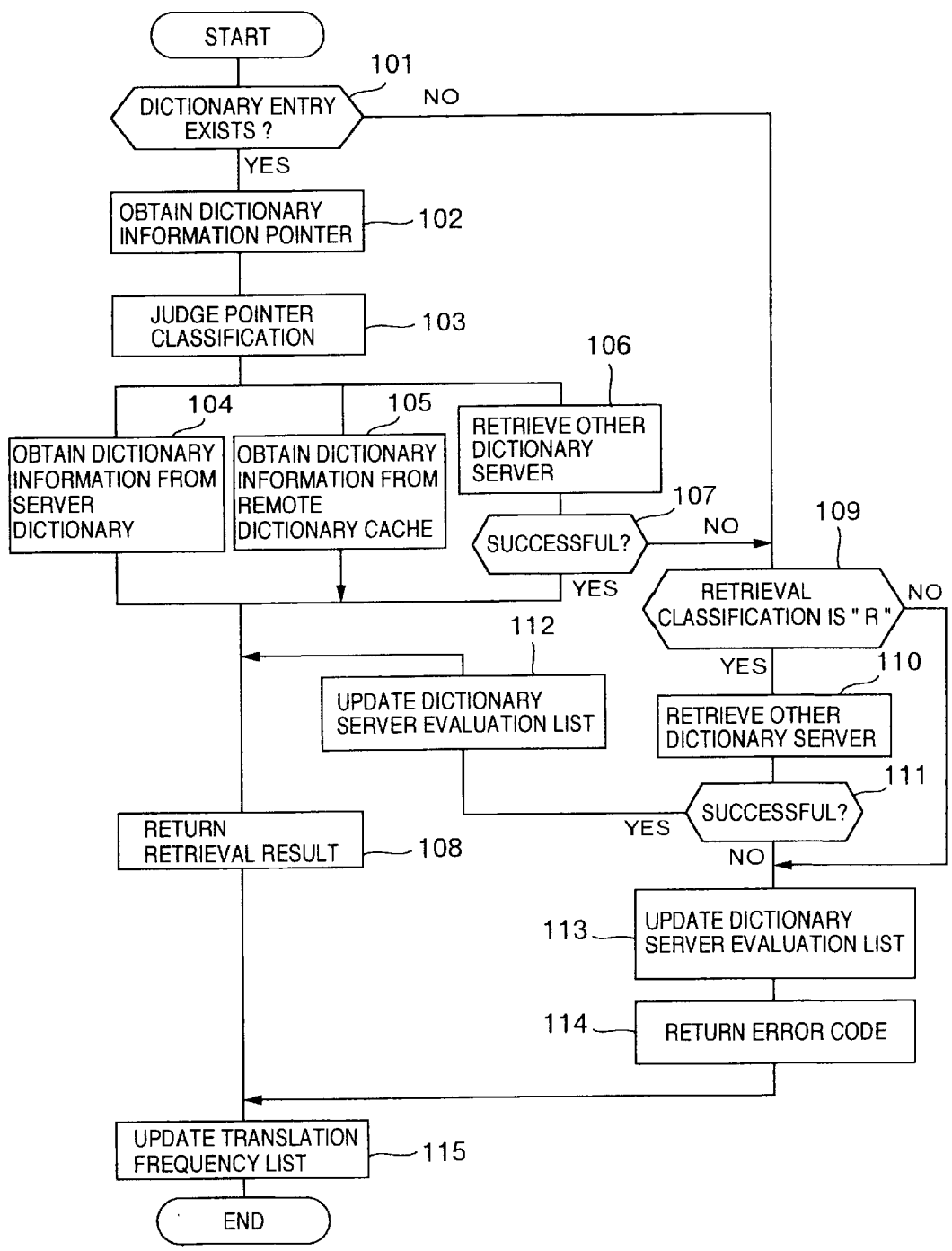
FIG. 22 is a flowchart to which reference will be made in explaining a processing done by a server side in a translation processing.

Referring to FIG. 22, and following the start of operation, if the server is requested to retrieve a certain dictionary entry in the processing (step S403 in FIG. 16) on the client side, the dictionary server retrieves the distributed dictionary index 9 to determine whether or not the dictionary entry exists (step S101). If the dictionary entry does not exist as represented by a NO at the decision step S101, then control goes to a step S109. If the dictionary entry exists as represented by a YES at the decision step S101, then control goes to a step S102, whereat a corresponding dictionary information pointer is obtained, and a pointer classification is checked at a step S103. If the pointer classification designates the server dictionary, then control goes to a step S104. If the pointer classification designates the remote dictionary cache 5, then control goes to a step S105. If the pointer classification designates other dictionary server, then control goes to a step S106.

If the pointer classification designates the server dictionary, then control goes to the step S104, whereat dictionary information is read out from the server dictionary. However, if there exists a dictionary corresponding to URL corresponding to a value of URL column in the retrieval request data, then it is determined whether or not a dictionary entry exists in the dictionary corresponding to URL. If the dictionary corresponding to URL exists, then dictionary information is read out from the dictionary corresponding to URL.

If the pointer classification designates the remote dictionary cache 5 (step S103), then control goes to the step S105, whereat dictionary information is read out from the remote dictionary cache 4. If there exists the dictionary entry and the pointer classification designates the dictionary server (step S103), then control goes to the step S106, whereat a destination of retrieval request to other dictionary server is set to L and the dictionary retrieval request is issued. The reason that the destination of retrieval request is set to L is that it is clear that other dictionary server which executes the retrieval request has dictionary information. Then, control goes to the next decision step S107, whereat it is determined whether or not the retrieval request to other dictionary server is successful. If the retrieval request to other dictionary server is successful as represented by a YES at the decision step S107, then the processing at a step S108 is executed. If on the other hand the retrieval request is not successful as represented by a NO at the decision step S107, then the processing at a step S109 is executed.

In the step S108, the retrieval result thus obtained is returned to the client of the destination of the retrieval request. The structure of the returned data is similar to that shown in FIG. 9. While the thus obtained retrieval result is directly returned to the client which requests the retrieval when the retrieval request in the dictionary server is executed recursively as described above, the present invention is not limited thereto, and the obtained retrieval result may be returned through the dictionary server which mediates the retrieval request.

If the retrieval in other dictionary server is not successful as represented by a NO at the decision step S107, then control goes to the next decision step S109, whereat it is determined whether or not the destination of retrieval request is R. If the destination of retrieval request is R as represented by a YES at the decision step S109, then control goes to a step S110. If the destination of retrieval request is not R as represented by a NO at the decision step S109, then control goes to a step S113.

If the destination of retrieval request is R, then control goes to the step S110, whereat it is checked whether or not the dictionary retrieval to other dictionary server is stopped. If the dictionary retrieval to other dictionary server is not stopped, then the dictionary information retrieval of the dictionary entry is requested to other dictionary server. It is determined based on the retrieval depth and the time of retrieval request issued in the retrieval request data whether or not the dictionary retrieval is stopped. The server of dictionary of retrieval request is determined based on the priority described in the step S25 (FIG. 7). The details were already described at the step S25, and therefore need not be described herein. Then, control goes to the next decision step S111, whereat it is determined whether or not the retrieval request is successful. If the retrieval request is successful as represented by a YES at the decision step S111, then control goes to a step S112, whereat the dictionary server evaluation list 8 is updated. The dictionary server evaluation list 8 is similar to that shown in FIG. 14. The manner in which the equivalent is changed by the user will be described later on. Here, the retrieval frequency of the corresponding dictionary server is incremented by one, and the success frequency is incremented by one.

If the retrieval classification is not R as represented by a NO at the decision step S109, and if the retrieval request is not successful as represented by a NO at the decision step S111, then control goes to the step S113, whereat the dictionary server evaluation list 8 is updated. Here, only the retrieval frequency is incremented by one. Then, control goes to a step S114, whereat the error code is returned to the retrieval request destination. Then, control goes to a step S115, whereat the URL translation frequency list 7 is updated, and then control is ended.

According to the above-mentioned processing, dictionary information concerning the dictionary entry of which the dictionary information is requested to be retrieved by the client may be returned to the client.

The client in this embodiment is not necessarily an apparatus exclusively-designed for translation. An equal processing can be executed by installing a computer program for adding a communication function and a translation function on a general information processing apparatus having an information processing function.

According to a communication program loaded with the communication function, it becomes possible to request a retrieval to other information processing apparatus connected through the network or to receive any information. In the case of the translation, a variety of information such as a meaning of a word, a role on the grammar, a derivative and a background in which the word is generated may be received.

The program for adding the translation function designates the following processing.

Initially, a translation target document to be translated is analyzed in a morphological analysis fashion (corresponding to the step S401 in FIG. 16), and a meaning of a word to be looked up in a dictionary is examined by a dictionary of its own terminal (corresponding to the steps S402, S403 in FIG. 16). The dictionary may be prepared as a part of the translation program and installed on the information processing apparatus on the client side together with the translation program. Alternatively, a dictionary database of a desired language may be prepared separately. At any rate, a dictionary has to be set in a close range as an apparatus on the client side, and hence a word can be easily looked up in a dictionary.

If the processing for looking up a word in a dictionary by using a dictionary prepared in the apparatus on the client side is successful, then by using equivalents obtained from the dictionary, the syntactic analysis, the syntactic transfer, the generation of translated sentence and the display of translated sentence (corresponding to the steps S405 to S408 in FIG. 16) are executed, and then the translation processing of the translation unit (predetermined unit of sentence, clause, grammar, meaning, etc.) is ended. A similar processing is sequentially executed on the next translation, and translated sentences are displayed on a display apparatus of the information processing terminal on the client side.

If an equivalent of a word (candidate word looked up in a dictionary) is not discovered from the dictionary of the terminal on the client side, then a hypothesis (or temporary translation) is set in that equivalent (unknown word) (corresponding to the step S404 in FIG. 16).

Then, as the processing executed by the apparatus on the client side, the processing ranging from the syntactic analysis to the display of the translated sentence (however, the hypothesis (or temporary translation)) portion is displayed in the state of the words that are presented before the translation by drawing an under-line or changing a color of characters or a color of a background) is continuously executed under the assumption that the hypothesis (or temporary translation) is correct.

On the other hand, the word in which the hypothesis is set is paused from being determined in translation in the apparatus on the client side as described above. While other succeeding portion is translated continuously, during the succeeding portion is translated, the apparatus on the client side requests a retrieval of information concerning an unknown word to other information processing apparatus through the network (corresponding to the step S403 in FIG. 16).

Information concerning the unknown word is information necessary for the translation such as a meaning of unknown word in a dictionary or a grammatical rule, and means information that cannot be learned by only the apparatus on the client side.

The apparatus on the client side manages the hypothesis set to the unknown word which is inquired to other information processing apparatus in the form of a table (corresponding to the step S409 in FIG. 16).

While the apparatus on the client side continuously translates the document under the condition that the hypothesis is set on the translation of the unknown word, the apparatus on the client side monitors the reception of the result with respect to the retrieval of the information concerning the unknown word transmitted to other information processing apparatus. If the apparatus on the client side receives the retrieval result (corresponding to the step S410 in FIG. 16), the apparatus on the client side compares the hypothesis set on the translation of the unknown word with the received retrieval result. If it is determined that the hypothesis is incorrect, then the translation based on the hypothesis is determined (corresponding to the steps S411 to S413 in FIG. 16). Then, until the translation of the document to be translated is completed by correcting the displayed final translated sentence, the translation unit is read in, it is determined whether the setting of the hypothesis is approved or not, the hypothesis is inquired, and the translation is executed at the same time. Also, information concerning the hypothesis is obtained and judged, and the translated result is combined.

The program for executing the above-mentioned processing is stored in a magnetic recording medium such as a floppy disk, an optical recording medium such as a CD-ROM, a DVD disc or an optical card, a magneto-optical recording medium and a semiconductor memory such as a flash memory. This program may be read in a CPU of a computer system and downloaded from a storage of other information processing apparatus to a memory of its own terminal through a network, in which it may be processed by a CPU.

Incidentally, while the dictionary information of the unknown word is retrieved when the portion that cannot be translated is the unknown word as described above by way of example, the present invention is not limited thereto and may be easily extended to the retrieval of other translation knowledge. By way of example, the case in which co-occurrence data for the syntactic analysis are retrieved from a translation knowledge server will be described below.

The co-occurrence data are a set of words related to each other from a meaning standpoint and which tend to appear simultaneously. If such co-occurrence data are accumulated, then it is possible to cancel an ambiguity in the machine translation processing. FIG. 23 shows such an example. The sentence shown in FIG. 23 as an example has two ambiguities from a syntax standpoint. Specifically, a preposition phrase "with four doors" modifies either a noun phrase "a car" or a verb phrase "bought a car". In this case, if co-occurrence data (car has doors) of (car, door) are stored, then it is possible to obtain a correct answer.

Since such co-occurrence data are information of a set of words, co-occurrence data of the which the number is as large as square of the dictionary information are required, and become large in size as compared with a dictionary. Therefore, it is not practical for the users to individually possess co-occurrence information.

If the present invention is applied to the above-mentioned case, then at the time an ambiguity occurs when the syntax is analyzed in the translation processing, the apparatus on the client side requests a retrieval of co-occurrence information to the dictionary server. At the same time, the apparatus on the client side outputs a result by temporarily executing the translation processing in accordance with default information (it is generally judged that a modifier modifies word, phrase, etc. located at the closest position). At the time the co-occurrence information are returned, the apparatus on the client side compares an analyzed result of a default with an analyzed result based on the co-occurrence information. If the compared result is correct, then the apparatus on the client side continues the processing. If the compared result is not correct, then the apparatus on the client side can obtain a correct translated sentence by executing the analysis processing with the co-occurrence information.

Further, when the apparatus on the client side recognizes a portion that cannot be translated, the client transmits a sentence containing the portion that cannot be translated to the dictionary server, executes the translation processing in the dictionary server, and returns a translated result to the server. If the translated result obtained by the client and the translated result obtained by the server agree with each other, then the processing is executed as it is. If they are different from each other, then the result obtained by the client may be replaced with the translated result obtained by the server.

As described above, in application, the present invention is not limited to only dictionary information, and a combination of the client and a high-order server which provides a translation knowledge is able to provide a translation of a high quality through the network.

(d) To Share Dictionary Information

A processing for sharing equivalent. alteration information by a user in a machine translation method using a dictionary server will be described next. It is frequently observed that a bilingual dictionary has a plurality of equivalents with respect to one dictionary entry. In this case, it is frequently observed that an equivalent selected by a machine translation system upon translation is incorrect. Heretofore, there has been known a system in which other equivalents are displayed in accordance with an instruction of the user and a suitable equivalent is selected by the user. Further, if the system learns information selected by the user, then in order to execute the succeeding equivalent selection processing correctly, when an equivalent is selected in a post edit, a new equivalent can automatically be stored in a user dictionary. The above-mentioned technology is based on an idea that an equivalent may uniquely be determined in a certain specific field whose translation is desired by the user. However, according to the above-mentioned method of the related art, a high translation accuracy cannot be obtained. For example, "president" in English has two equivalents of "社長" and "大統領" in Japanese. However, it is not possible to correctly determine the equivalent of the word "president" by the above-mentioned rough method using the field.

According to the present invention, since the dictionary server is shared by a number of clients so that dictionary information concerning the same HTML document is retrieved a number of times, if equivalent selection information obtained by the user is stored at every document, then it becomes possible to select equivalents with a high accuracy. The equivalent alteration information sharing processing will be described below.

Figure 25:
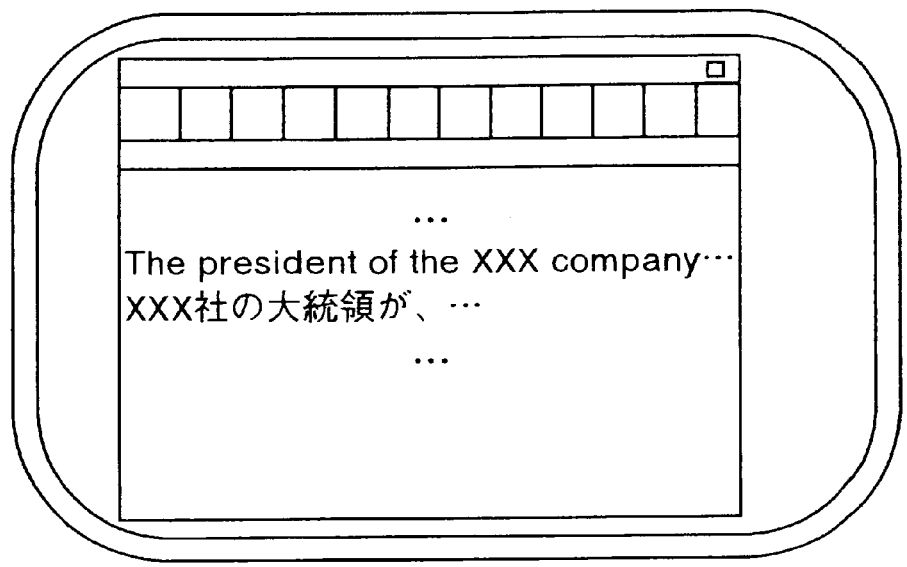
FIG. 25 is a diagram showing an example of a translated sentence in which an equivalent selected by the system is wrong.

Initially, a processing executed on the client side will be described with reference to a flowchart of FIG. 24. This processing will be described with an example in which an equivalent of "president" becomes "大統領" by mistake as shown in FIG. 25.

Figure 26:
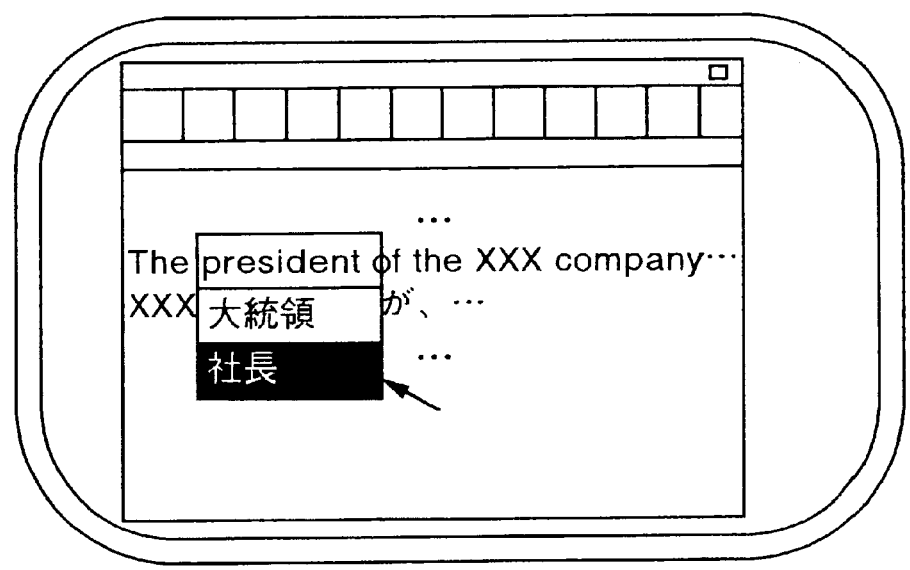
FIG. 26 is a diagram showing an example of a translation equivalent.

When the user discovers an incorrect equivalent or a portion whose meaning is doubtful during the user is reading a sentence displayed on the screen, the user instructs the corresponding portion on the screen by a pointing device such as a mouse. In the case of this example, the user instructs "president". At that time, the system detects the word instructed on the screen by the user (step S501). Incidentally, the system can be easily extended in such a manner that, when the user instructs "大統領", the user can obtain "president" with reference to a correspondence relationship between English word and Japanese word obtained by a Japanese-English dictionary and the translation processing. Then, the system retrieves a dictionary by using the above-mentioned words as dictionary entries and checks whether or not there exist dictionary entries (step S502). In that case, with respect to the processing of the inflection, the processing is executed in the same way as described in the step S303. Also, the dictionary retrieval targets are both of the temporary dictionary retrieved from the dictionary server and the dictionary which the client includes. If the dictionary entry exists in the temporary dictionary and the client's dictionary, all of candidate words of equivalents are displayed on the screen (step S504). FIG. 26 shows an example of candidate words of equivalents displayed on the screen. If the dictionary entry is not found in the dictionary, then the point indicating that the dictionary entry is not found is displayed to the user, and the system awaits the next processing in which the user instructs a word.

Figure 27:
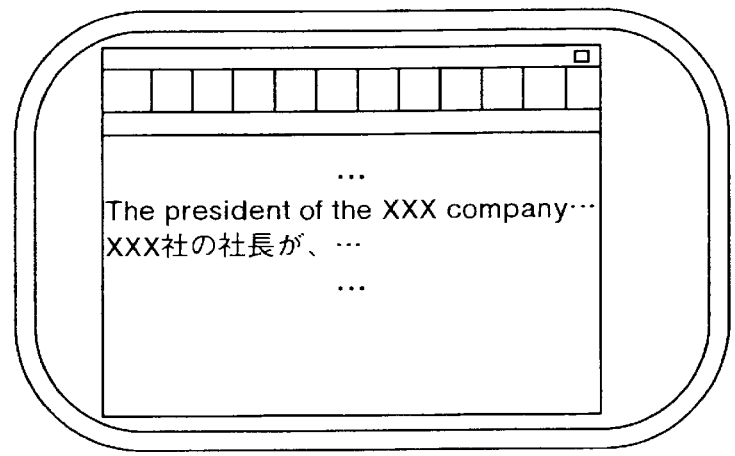
FIG. 27 is a diagram showing an example of a translated sentence obtained after an equivalent was altered.

When the candidate words of the equivalents are displayed on the screen, if the user finds out a correct equivalent by examining the displayed candidate words of the equivalents, then the user instructs the correct equivalent by a suitable pointing device such as a mouse. It is determined by the system at a decision step S505 whether or not the user instructs the alteration of the equivalent. If the user instructs the alteration of the equivalent as represented by a YES at the decision step S505, the control goes to a step S506, whereat the equivalent is altered and the altered equivalent is displayed on the screen. As a consequence, the translated sentence is changed as shown in FIG. 27. Finally, control goes to a step S507, whereat the system transmits a set of dictionary entry designated by the user and the selected equivalent to the dictionary server.

Figure 28:
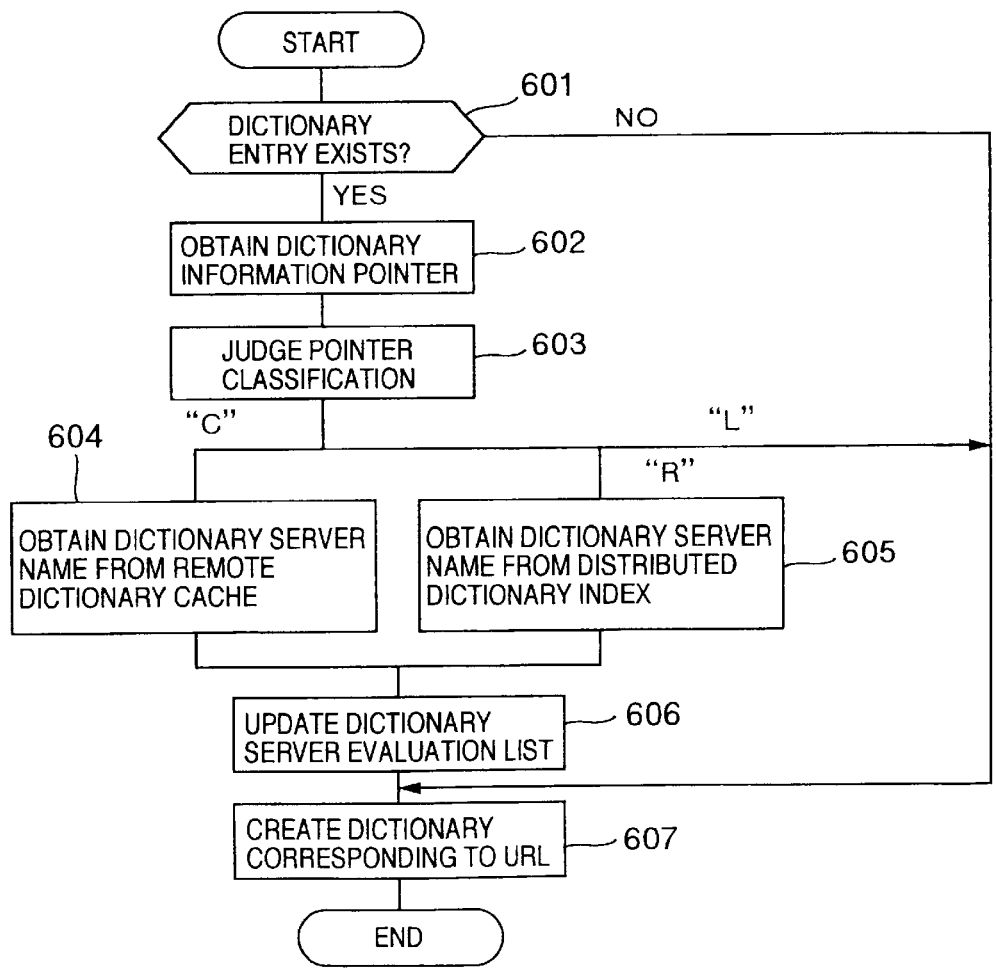
FIG. 28 is a flowchart to which reference will be made in explaining a processing done by the server side in a processing for creating a dictionary corresponding to URL.
Figure 29:
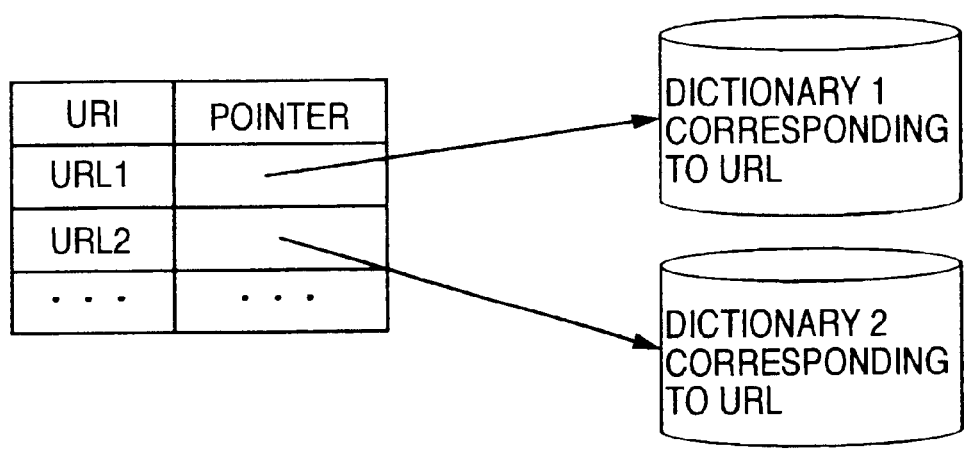
FIG. 29 is a conceptual diagram of a dictionary corresponding to URL.

A processing on the dictionary server side in the equivalent alteration information sharing processing will be described with reference to FIG. 28. Referring to FIG. 28, and following the start of operation, control goes to a decision step S601, whereat when receiving the equivalent alteration information, the dictionary server retrieves the dictionary entry from the received data by the distributed dictionary index 9. If the dictionary entry does not exist as represented by a NO at the decision step S601, then control goes to a step S607. If on the other hand the dictionary entry exists as represented by a YES at the decision step S601, then control goes to a step S602, whereat a dictionary information pointer is obtained. Then, control goes to a step S603, whereat a pointer classification is judged. If the pointer classification is C, then control goes to a step S604. If the pointer classification is R, then control goes to a step S605. If the pointer classification is L, then control goes to the step S607. In the step S607, a dictionary server is obtained from the remote dictionary cache 5. In the step S605, a dictionary server name is obtained from the distributed dictionary index 9. In a step S606, the dictionary server name thus obtained is retrieved in the dictionary server evaluation list 8 and the equivalent alteration frequency is incremented by one. In the next step S607, a dictionary corresponding to URL is created from the received data. FIG. 29 shows an arrangement of the dictionary corresponding to URL. Incidentally, while the dictionary corresponding to URL is arranged as a separate file as described above, equivalents may be registered on the server dictionary and the remote dictionary cache 5 and the URL may be described as the equivalent selection condition with similar effects being achieved.

If the equivalent alteration executed by the user on the client side is reflected on the dictionary corresponding to URL, then it becomes possible for other users to share the correct equivalent which is selected by a certain user to a certain URL. While the dictionary information is transmitted in response to the retrieval request on the client side according to the embodiment of the present invention, the dictionary information in the dictionary corresponding to URL is also useful for translating words other than unknown words. Therefore, the present invention may take the following variant. That is, at the time the translation is started in the client, a URL of a document to be translated is transmitted to the dictionary server regardless of whether an unknown word exists or not. If there exists a dictionary corresponding to the URL of the document to be translated, then dictionary information in the dictionary corresponding to URL are transmitted to the client all together.

According to the above-mentioned processing, the user is able to use a dictionary of a large scale located on the dictionary server. Thus, the user can obtain a translated sentence of a high quality as compared with the case in which the user uses only the dictionary which the client has locally. Further, even when a speed of a network is low, equivalents may be displayed on the screen in the sequential order in which dictionary information are obtained. Thus, as compared with the case in which the processing is executed after all information were obtained, the user can use the system more conveniently. Moreover, if information in which the user alters the equivalent is returned to the server and such information is shared by the users, then it is possible to use the equivalent of higher quality. Further, the dictionary server can respond to the retrieval request of the user at a high speed by previously collecting words having a large possibility that hey will receive the retrieval request from the client. Furthermore, if dictionary information does not exist on the dictionary server, then by estimating other dictionary server having a large possibility that it will have a required dictionary entry, it becomes possible to return desired dictionary information to the client at a low communication cost.

The dictionary server includes the server dictionary and the dictionary index in which there are stored words in the server dictionary and the dictionary entries of dictionaries existing in other dictionary server. The dictionary server returns dictionary information in the server dictionary with respect to the word existing in the server dictionary in response to the retrieval request from the client, and issues the retrieval request to other dictionary server with respect to words existing in other dictionary servers. Furthermore, if it is not clear which dictionary server the word to be retrieved exists, then dictionary servers having a large possibility that they will have dictionary information are estimated statistically, and the retrieval request is issued. Thus, the dictionary information of the dictionaries distributed on the network can be retrieved efficiently.

The client recognizes the portion that cannot be translated such as the unknown word during the translation processing is executed on the client. Then, the client requests the retrieval of the translation knowledge with respect to the syntactic unit containing the above-mentioned portion that cannot be translated and which is arranged from a syntax standpoint to the dictionary server, and continues the translation of the contents following the above syntactic unit. At the time the translation knowledge is returned from the dictionary server to the client, the client creates the translated sentences of the whole of the document to be translated containing the above-mentioned portion that cannot be translated. Thus, even when the speed of the network is low and there is required a lot of time to issue the retrieval request to the dictionary server, it is possible to provide a translation system which is convenient for the user.

Furthermore, if the equivalent alteration information entered by the user is stored in response to the URL of the HTML document which becomes the translation target, then when other user translates the same document one more time, it becomes possible to provide equivalents of a higher quality.

Having described a preferred embodiment with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A machine translation method for translating a document by using a translation knowledge stored in a storage in an information processing apparatus connected to a network, comprising the steps of:

transmitting, during a time translating a sentence written in a first language, an inquiry for inquiring a translation knowledge for translating a syntactic unit of said sentence written in said first language containing an unknown word to said network, after translating other words of said sentence into a second language, if said unknown word that cannot be translated into said second language is recognized during translation of said document;

estimating a part of speech for said unknown word to apply a hypothesis-setting rule during translation of said sentence;

continuing translation of a syntax following said syntactic unit of said sentence; and translating said syntactic unit of said sentence by using an answer to replace the translation of said sentence when said answer to said inquiry is received.

2. A machine translation method as claimed in claim 1, wherein said inquiry step includes a first sub-step for outputting said syntactic unit translated in the form of having said unknown word temporarily processed but in said first language when said unknown word that cannot be translated into said second language is recognized, and said syntax completion step includes a second sub-step for outputting a syntactic unit in which said unknown word in said syntactic unit is translated into said second language by using said answer.

3. A machine translation method as claimed in claim 2, wherein said first sub-step includes a sub-step for translating said syntactic unit into said translated syntactic unit in the form of having said unknown word processed temporarily but in said first language by estimating a part of speech to which said unknown word belongs, and said second sub-step includes a sub-step for comparing an estimated part of speech with a part of speech of said unknown word contained in said answer, translating said unknown word if said estimated part of speech and said part of speech of said unknown word agree with each other, and translating again said syntactic unit based on said answer if said estimated part of speech and said part of speech of said unknown word do not agree with each other.

4. A machine translation method as claimed in claim 1, wherein said translation step includes a sub-step for translating said syntactic unit into a translated syntactic unit in the form of having said unknown word processed temporarily but in said first language by estimating a part of speech to which said unknown word belongs, and said syntax completion step includes a sub-step for comparing an estimated part of speech with a part of speech of said unknown word contained in said answer, translating said unknown word if said estimated part of speech and said part of speech of said unknown word agree with each other, and translating again said syntactic unit based on said answer if said estimated part of speech and said part of speech of said unknown word do not agree with each other.

5. A machine translation method according to claim 1, further comprising the steps of:

outputting a plurality of equivalents corresponding to dictionary entries in the syntax in said document to an output apparatus together with an alternative request during translation of said document; and using an equivalent designated by a user from said output apparatus and storing a designated word in a dictionary of said storage.

6. A machine translation method according to claim 1, wherein said translation knowledge includes co-occurrence data indicating a set of words having related definitions for the syntactic analysis that are usable to cancel an ambiguity during said translation.

7. A machine translation method according to claim 1, further comprising a step of displaying said sentence in said second language including said unknown word in said first language.

8. A computer readable storage medium used in an information processing apparatus connected to a network and which is used to translate a document by using a translation knowledge, comprising:

a command code for transmitting, during a time translating a sentence written in a first language, an inquiry for inquiring a translation knowledge for translating a syntactic unit of said sentence written in said first language containing an unknown word and a correct grammar to said network, after translating other words of said sentence into a second language, when said unknown word that cannot be translated into said second language is recognized during translation of a document;

a command code for estimating a part of speech for said unknown word to apply a hypothesis-setting rule during translation of said sentence;

a command code for continuing translation of a syntax following said syntactic unit of said sentence; and a command code for translating said syntactic unit of said sentence by using an answer to replace the translation of said sentence when said answer to said inquiry is received.

9. A computer readable storage medium as claimed in claim 8, wherein said command code for transmitting an inquiry includes a first sub-command code for outputting a translated syntactic unit in the form of having said unknown word temporarily processed but in said first language when said unknown word that cannot be translated into said second language is recognized, and said command code for completing translation includes a second sub-command code for outputting said translated syntactic unit in which said unknown word in said syntactic unit is translated by using said answer.

10. A computer readable storage medium as claimed in claim 8, further comprising a command code for displaying said sentence in said second language including said unknown word in said first language.

11. An information processing apparatus connected to a network for translating a document by using a translation knowledge, comprising:

a dictionary;

an inquiry device for transmitting, during a time translating a sentence written in a first language, an inquiry for inquiring said translation knowledge for translating a syntactic unit of said sentence written in said first language containing an unknown word and a correct grammar to said network, after translating other words of said sentence into a second language, when said unknown word that cannot be translated into said second language is recognized during translation of said document; and a translation device for estimating a part of speech for said unknown word to apply a hypothesis-setting rule during translation of said sentence, and for continuing translation of a syntax following said syntactic unit of said sentence, and in which said translation device translates said syntactic unit by using an answer to replace the translation of said sentence when said answer to said inquiry is received.

12. An information processing apparatus as claimed in claim 11, wherein said inquiry device outputs said syntactic unit translated in the form of having said unknown word temporarily processed but in said first language when said unknown word that cannot be translated into said second language is recognized, and said translation device outputs a syntactic unit in which said unknown word in said syntactic unit is translated into said second language by using said answer.

13. An information processing apparatus as claimed in claim 11, further comprising:
 a retrieval device for retrieving said dictionary when a dictionary retrieval request concerning a dictionary entry of a document is received; and
 a transmission device for transmitting a retrieval request to said network when said dictionary entry does not exist in said dictionary, and in which said transmission device determines a transmission destination to which said retrieval request is transmitted based on priorities supplied to a plurality of other dictionary servers by retrieval results received to a plurality of past retrieval requests and a field of said dictionary entry.

14. An information processing apparatus as claimed in claim 13, wherein said retrieval device retrieves said dictionary when a dictionary retrieval request concerning a dictionary entry of a document is received; and wherein said transmission device transmits a retrieval request to said network when said dictionary entry does not exist in said dictionary, and determines a transmission destination to which said retrieval request is transmitted based on a priority supplied to a plurality of other dictionary servers by retrieval results received in response to a plurality of past retrieval requests and a field of said dictionary entry.

15. An information processing apparatus as claimed in claim 13, wherein said dictionary is constructed for retrieval by:
 determining importance of a plurality of documents based on respective frequencies of retrieval requests to said plurality of documents on said network;
 retrieving an important document from said plurality of documents in order to recognize an unknown word;
 outputting an important unknown word to an output apparatus together with an input request of a corresponding equivalent; and
 memorizing an equivalent inputted on said output apparatus in said dictionary.

16. An information processing apparatus according to claim 11, further comprising a display device for displaying said sentence in said second language including said unknown word in said first language.

* * * * *